United States Patent
Zhang et al.

(10) Patent No.: US 11,146,493 B2
(45) Date of Patent: Oct. 12, 2021

(54) NETWORK CONFIGURATION METHOD AND DEVICE

(71) Applicant: Huawei Technologies Co., Ltd., Shenzhen (CN)

(72) Inventors: Jiayi Zhang, Beijing (CN); Tongtong Wang, Beijing (CN); Xinyuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/071,639

(22) Filed: Oct. 15, 2020

(65) Prior Publication Data

US 2021/0119922 A1 Apr. 22, 2021

(30) Foreign Application Priority Data

Oct. 16, 2019 (CN) .......................... 201910985050.2

(51) Int. Cl.
*G06F 15/16* (2006.01)
*H04L 12/815* (2013.01)
*H04L 12/26* (2006.01)
*H04L 12/801* (2013.01)
*H04L 12/835* (2013.01)

(52) U.S. Cl.
CPC .......... *H04L 47/22* (2013.01); *H04L 43/0852* (2013.01); *H04L 47/17* (2013.01); *H04L 47/30* (2013.01)

(58) Field of Classification Search
CPC ..... H04L 47/22; H04L 43/0852; H04L 47/17; H04L 47/30
See application file for complete search history.

(56) References Cited

U.S. PATENT DOCUMENTS

| | | | | |
|---|---|---|---|---|
| 6,532,213 B1 * | 3/2003 | Chiussi | ................... | H04L 47/22 370/230.1 |
| 6,661,797 B1 * | 12/2003 | Goel | ....................... | H04L 45/00 370/395.21 |
| 7,680,922 B2 * | 3/2010 | Rabinovitch | ....... | H04L 41/5009 709/224 |

(Continued)

FOREIGN PATENT DOCUMENTS

EP 0873037 B1 7/2002

OTHER PUBLICATIONS

IEEE Std 802.1Q, 2018, "IEEE Standard for Local and Metropolitan Area Networks-Bridges and Bridged Networks," May 2018, 1993 pages.

(Continued)

*Primary Examiner* — Hieu T Hoang
(74) *Attorney, Agent, or Firm* — Conley Rose, P.C.

(57) ABSTRACT

A network configuration method includes determining an end-to-end latency upper bound of data traffic between two end nodes, determining an end-to-end latency constraint of the data traffic between the two end nodes, determining, based on the end-to-end latency upper bound and the end-to-end latency constraint, for a first network shaper, at least one configuration parameter that satisfies the end-to-end latency constraint, and configuring the first network shaper for the data traffic based on the at least one configuration parameter such that the traffic after being shaped by the shaper satisfies the network latency constraint.

20 Claims, 9 Drawing Sheets

(56) References Cited

U.S. PATENT DOCUMENTS

| 2005/0097206 | A1* | 5/2005 | Rabinovitch | H04L 41/509 |
| | | | | 709/224 |
| 2016/0218943 | A1* | 7/2016 | Djukic | H04L 41/142 |
| 2021/0073689 | A1* | 3/2021 | Finzi | H04Q 11/04 |

OTHER PUBLICATIONS

Finn, N., et al, "DetNet Bounded Latency," draft-finn-detnet-bounded-latency-04, Jun. 25, 2019, 14 pages.
Zhang, J., et al, "Analysis of TSN for Industrial Automation based on Network Calculus," Sep. 10, 2019, 4 pages.
Zhang, J., et al, "Bounded latency calculating method using network calculus," IEEE 802.1 TSN Interim, Jan. 2019, 7 pages.

* cited by examiner

NETWORK CONFIGURATION METHOD AND DEVICE

CROSS-REFERENCE TO RELATED APPLICATIONS

This application claims priority to Chinese Patent Application No. 201910985050.2, filed on Oct. 16, 2019, which is hereby incorporated by reference in its entirety.

TECHNICAL FIELD

Embodiments of this application relate to the field of communications technologies, and in particular, to a network configuration method and device.

BACKGROUND

In an existing network running process, traffic may need to be sent according to a user traffic contract signed with a transmit end, to constrain an average rate and a burst size in traffic sending. However, it is sometimes difficult to send the traffic by 100% or highly complying with the user traffic contract. In this case, a network ingress shaper needs to limit inbound traffic at an egress, to ensure that the inbound traffic satisfies a specific traffic limit. This avoids network congestion in a traffic transmission process caused by excessive sent traffic, or avoids inappropriate traffic jitter caused by large fluctuation of a data flow transmission rate.

With continuous upgrade of communications technologies, especially development of fifth generation (5G) network technologies, some service scenarios have increasingly strong requirements on high reliability and a low latency. For example, to satisfy a service requirement for 5G ultra-reliable low-latency communication (5G URLLC), a bearer network needs to provide a bound data plane storage forwarding latency. An existing network shaper is mainly used to limit an average bandwidth of traffic, and an input parameter of the shaper is mainly determined based on requirements such as the user traffic contract. Parameter setting is comparatively fixed, or is adjusted through manual intervention only based on experience. As a result, the existing network shaper cannot well satisfy an actual network requirement.

SUMMARY

Embodiments of this application provide a network configuration method and device such that a shaper parameter is configured based on that data traffic transmission satisfies a service latency constraint, to ensure that the traffic transmission better and more flexibly satisfies a service scenario requirement, and network service quality is improved.

According to a first aspect, an embodiment of this application provides a network configuration method. The method includes determining an end-to-end latency upper bound of data traffic between two end nodes, determining an end-to-end latency constraint of the data traffic between the two end nodes, determining, based on the end-to-end latency upper bound and the end-to-end latency constraint, for a first network shaper, at least one configuration parameter that satisfies the end-to-end latency constraint, and configuring the first network shaper for the data traffic based on the at least one configuration parameter.

In this application, a shaper parameter is configured based on that data traffic transmission satisfies the end-to-end latency constraint, to avoid, as much as possible, network congestion caused by the data traffic transmission in a network and a packet loss, better adapt to a service scenario requirement, and improves network service quality.

In an optional design, the end-to-end latency upper bound is represented as a latency upper bound function, and the determining an end-to-end latency upper bound of data traffic between the two end nodes includes generating the latency upper bound function using an arrival curve function and a service curve function that are based on a network calculus algorithm.

In an optional design, the end-to-end latency upper bound is represented as a latency upper bound function including a first variable, the first variable represents a maximum burst size allowed by traffic output by the first network shaper, and the first variable belongs to the at least one configuration parameter.

In an optional design, a value of the first variable is calculated under a condition that the end-to-end latency upper bound satisfies the end-to-end latency constraint. Optionally, the first variable represents a maximum burst size allowed by traffic output by the first network shaper, and the first variable belongs to the at least one configuration parameter. Optionally, a first rate is determined. The first rate is an average output rate of the data traffic on the first network shaper, the first rate is greater than or equal to an average input rate of the data traffic and is less than or equal to a minimum value of service rates of all forwarding nodes between the two end nodes, and the first rate belongs to the at least one configuration parameter.

In this application, the end-to-end latency upper bound in a network, for example, in the network using a time asynchronization-based scheduling policy is determined based on the network calculus algorithm, and the configuration parameter of the shaper is determined under a condition that the end-to-end latency upper bound satisfies the end-to-end latency constraint, to avoid the network congestion caused by a latency and the packet loss.

In an optional design, configuration parameters of one or more second network shapers respectively corresponding to one or more forwarding nodes between the two end nodes are determined, and the configuration parameters of the one or more second network shapers are the same as corresponding configuration parameters of the first network shaper such that per-hop regulation is performed on the data traffic that flows through the one or more forwarding nodes.

In this application, the parameters are configured on the network shapers used for each forwarding node, to perform the per-hop regulation on each forwarding node, and avoid, as much as possible, a traffic burst on a forwarding node, caused by latency accumulation, and the packet loss caused by the congestion.

In an optional design, a buffer upper bound of the current forwarding node is determined based on an arrival curve function and a service curve function at a previous forwarding node through which the data traffic flows, and a buffer of the current forwarding node is determined based on the buffer upper bound, where the buffer is configured to temporarily store the data traffic in the current forwarding node.

In this application, appropriate buffer space may be configured for each forwarding node based on the buffer upper bound determined based on the network calculus algorithm, to avoid, as much as possible, the congestion caused by the latency in a traffic transmission process.

In an optional design, the determining, based on the end-to-end latency upper bound and the end-to-end latency constraint, for the first network shaper, at least one configuration parameter that satisfies the end-to-end latency constraint includes determining that the end-to-end latency upper bound satisfies the end-to-end latency constraint, when the end-to-end latency upper bound satisfies the end-to-end latency constraint, determining a maximum value of all the single-point bound latencies based on the single-point bound latencies of all the forwarding nodes between the two end nodes, and determining, based on the maximum value of all the single-point bound latencies, for the first network shaper, a configuration parameter that satisfies the end-to-end latency constraint.

In an optional design, the configuration parameter that satisfies the end-to-end latency constraint and that is determined for the first network shaper is a sending period, and another configurable parameter of the first network shaper further includes at least a maximum quantity of packets that can be sent in the configured sending period and/or a maximum packet length.

In this application, a satisfied latency constraint of shaped and output data traffic can be determined based on the single-point bound latency of each forwarding node. A configuration parameter of a network shaper can be configured accordingly, to ensure that the data traffic in a network, for example, in the network using a time synchronization-based scheduling policy, satisfies the end-to-end latency, to avoid the congestion in the data traffic transmission process as much as possible.

According to a second aspect, this application provides a network shaper configuration method. The method is applied to a network using a time asynchronization-based scheduling policy. The method includes determining a first end-to-end latency constraint of traffic, determining a first end-to-end latency upper bound of the traffic, and determining and configuring, based on the first end-to-end latency constraint and the end-to-end latency upper bound of the traffic, at least one configuration parameter for a shaper such that the traffic after being shaped by the shaper satisfies the first end-to-end latency constraint.

In this application, the at least one parameter of the network shaper is configured in the network using a time asynchronization-based scheduling algorithm, to ensure that the end-to-end latency upper bound of the data traffic in a transmission process satisfies the end-to-end latency constraint, and avoid network congestion caused by a latency and a data packet loss.

In an optional design, a configuration parameter of the shaper may be further adjusted, and the adjustment includes determining a second end-to-end latency constraint of the traffic, determining the first end-to-end latency upper bound of the traffic after being shaped based on a configuration parameter of a current shaper, determining whether the first end-to-end latency upper bound satisfies the second end-to-end latency constraint, and if determining that the first end-to-end latency upper bound does not satisfy the second end-to-end latency constraint, adjusting the at least one configuration parameter of the shaper based on the second end-to-end latency constraint such that a second end-to-end latency upper bound of the traffic after being shaped by the shaper satisfies the second end-to-end latency constraint.

In this application, in the network using the time asynchronization-based scheduling algorithm, the at least one configuration parameter of the network shaper can be adjusted and configured based on a change of the traffic transmitted in the shaper, a change of a latency constraint of a same traffic type, or the like. This ensures that the traffic after being shaped and output satisfies a new service constraint requirement.

In an optional design, the end-to-end latency upper bound is represented as a latency upper bound function, and the determining an end-to-end latency upper bound of data traffic between the two end nodes includes generating the latency upper bound function using an arrival curve function and a service curve function that are based on a network calculus algorithm.

In an optional design, the end-to-end latency upper bound is represented as a latency upper bound function including a first variable, the first variable represents a maximum burst size allowed by traffic output by the first network shaper, and the first variable belongs to the at least one configuration parameter.

In an optional design, a value of the first variable is calculated under a condition that the end-to-end latency upper bound satisfies the end-to-end latency constraint. Optionally, the first variable represents a maximum burst size allowed by traffic output by the first network shaper, and the first variable belongs to the at least one configuration parameter. Optionally, a first rate is determined. The first rate is an average output rate of the data traffic on the first network shaper, the first rate is greater than or equal to an average input rate of the data traffic and is less than or equal to a minimum value of service rates of all forwarding nodes between the two end nodes, and the first rate belongs to the at least one configuration parameter.

According to a third aspect, this application provides a network shaper configuration method. The method is applied to a network using a time synchronization-based scheduling policy. The method includes determining a first latency constraint requirement for traffic, and determining at least one configuration parameter of a shaper based on the first latency constraint requirement for the traffic such that the traffic after being shaped by the shaper satisfies the first latency constraint requirement.

In this application, the at least one parameter of the network shaper is configured in the network using a time synchronization-based scheduling algorithm, to ensure that an end-to-end latency upper bound of the data traffic in a transmission process satisfies an end-to-end latency constraint, and avoid network congestion caused by a latency and a data packet loss.

In an optional design, a configuration parameter of the shaper may be further adjusted, and the adjustment includes determining a second latency constraint requirement for the traffic, determining a first latency by the output traffic after being shaped based on a configuration parameter of a current shaper, determining whether the first latency satisfies the second latency constraint requirement, and if determining that the first latency does not satisfy the second latency constraint requirement, adjusting the at least one configuration parameter of the shaper based on the second latency constraint requirement such that a second latency of the traffic that being shaped by the shaper satisfies the second latency constraint requirement.

In this application, in the network using the time synchronization-based scheduling algorithm, the at least one configuration parameter of the network shaper can be adjusted and configured based on a change of the traffic transmitted in the shaper, a change of a single-point bound latency of a forwarding node, or the like. This ensures that the traffic after being shaped and output satisfies a new service constraint requirement.

In an optional design, the end-to-end latency upper bound is determined to satisfy the end-to-end latency constraint, when the end-to-end latency upper bound satisfies the end-to-end latency constraint, a maximum value of all the single-point bound latencies is determined based on the single-point bound latencies of all the forwarding nodes between the two end nodes, and a configuration parameter that satisfies the end-to-end latency constraint is determined for the first network shaper based on the maximum value of all the single-point bound latencies.

In an optional design, the configured configuration parameter is a sending period.

In an optional design, another configurable parameter further includes at least a maximum quantity of packets that can be sent in the configured sending period and/or a maximum packet length.

According to a fourth aspect, this application provides a network configuration device. The device includes a first determining unit configured to determine an end-to-end latency upper bound of data traffic between two end nodes, a second determining unit configured to determine an end-to-end latency constraint of the data traffic between the two end nodes, a parameter determining unit configured to determine, based on the end-to-end latency upper bound and the end-to-end latency constraint, for a first network shaper, at least one configuration parameter that satisfies the end-to-end latency constraint, and a shaper configuration unit configured to configure the first network shaper for the data traffic based on the at least one configuration parameter.

In an optional design, the end-to-end latency upper bound is represented as a latency upper bound function, and that the first determining unit determines the end-to-end latency upper bound of the data traffic between the two end nodes includes generating the latency upper bound function using an arrival curve function and a service curve function that are based on a network calculus algorithm.

In an optional design, the end-to-end latency upper bound is represented as a latency upper bound function including a first variable, the first variable represents a maximum burst size allowed by traffic output by the first network shaper, and the first variable belongs to the at least one configuration parameter.

In an optional design, that the parameter determining unit determines based on the end-to-end latency upper bound and the end-to-end latency constraint, for the first network shaper, the at least one configuration parameter that satisfies the end-to-end latency constraint includes calculating a value of the first variable under a condition that the end-to-end latency upper bound satisfies the end-to-end latency constraint.

In an optional design, the parameter determining unit is further configured to determine a first rate, where the first rate is an average output rate of the data traffic on the first network shaper, the first rate is greater than or equal to an average input rate of the data traffic and is less than or equal to a minimum value of service rates of all forwarding nodes between the two end nodes, and the first rate belongs to the at least one configuration parameter.

In an optional design, the shaper configuration unit is further configured to determine configuration parameters of one or more second network shapers respectively corresponding to one or more forwarding nodes between the two end nodes, where the configuration parameters of the one or more second network shapers are the same as corresponding configuration parameters of the first network shaper such that per-hop regulation is performed on the data traffic that flows through the one or more forwarding nodes.

In an optional design, the device further includes a buffer configuration unit, and the buffer configuration unit is configured to determine a buffer upper bound of the current forwarding node based on an arrival curve function and a service curve function at a previous forwarding node through which the data traffic flows, and determine a buffer of the current forwarding node based on the buffer upper bound, where the buffer is configured to temporarily store the data traffic in the current forwarding node.

In an optional design, that the second determining unit determines the end-to-end latency constraint of the data traffic between the two end nodes includes determining the end-to-end latency upper bound based on single-point bound latencies of all forwarding nodes between the two end nodes.

In an optional design, that the parameter determining unit determines based on the end-to-end latency upper bound and the end-to-end latency constraint, for the first network shaper, the at least one configuration parameter that satisfies the end-to-end latency constraint includes determining that the end-to-end latency upper bound satisfies the end-to-end latency constraint, when the end-to-end latency upper bound satisfies the end-to-end latency constraint, determining a maximum value of all the single-point bound latencies based on the single-point bound latencies of all the forwarding nodes between the two end nodes, and determining, based on the maximum value of all the single-point bound latencies, for the first network shaper, a configuration parameter that satisfies the end-to-end latency constraint.

In an optional design, the configuration parameter that satisfies the end-to-end latency constraint and that is determined for the first network shaper is a sending period, and another configuration parameter in the at least one configuration parameter of the first network shaper further includes a maximum quantity of packets that can be sent in the configured sending period and/or a maximum packet length.

According to a fifth aspect, this application provides network configuration device. The device includes a processor and a memory. The memory is configured to store a computer program. The processor is configured to invoke the computer program stored in the memory, to perform the method in any possible design of the first aspect.

According to a sixth aspect, this application provides a computer-readable storage medium or a computer program product configured to store a computer program. The computer program is used to perform the method in any possible design of the first aspect.

BRIEF DESCRIPTION OF DRAWINGS

To describe technical solutions in embodiments of this application more clearly, the following briefly describes accompanying drawings for describing the embodiments.

DESCRIPTION OF EMBODIMENTS

The following describes technical solutions in embodiments in this application with reference to accompanying drawings. A network architecture and a service scenario described in the embodiments of this application are intended to more clearly describe the technical solutions in the embodiments of this application, and do not constitute a limitation on the technical solutions provided in the embodiments of this application. A person of ordinary skill in the art may know that, with evolution of network architectures and emergence of new service scenarios, the technical solutions provided in the embodiments of this application are also applied to a similar technical problem.

Figure 1:
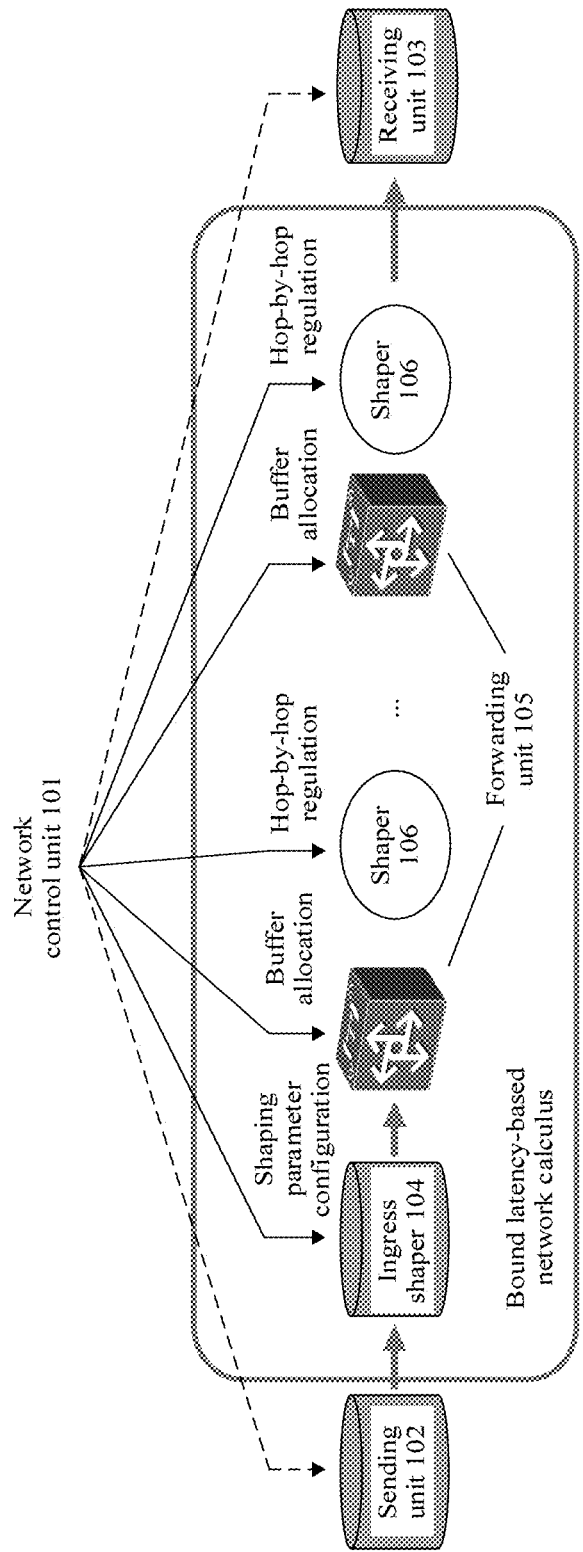
FIG. 1 is a schematic diagram of a network structure according to an embodiment of this application.

For clearer description, a network structure that can be used to implement the embodiments of this application is first described, as shown in FIG. 1. The network includes a sending unit 102, a receiving unit 103, and one or more forwarding units 105. The sending unit 102 is configured to send data traffic at an end, then the traffic may be forwarded in the network using a forwarding unit 105, and finally the receiving unit 103 receives the traffic at an end. The network may further include an ingress shaper 104 and one or more per-hop shapers 106. The ingress shaper 104 is usually configured to shape a single piece of traffic that enters a network ingress in a time period or a plurality of pieces of traffic that have a same forwarding path or a same forwarding target device. The single piece of traffic and the plurality of pieces of traffic may be respectively referred to as a single flow and a multi-flow. Before being shaped by the ingress shaper 104, the single flow and the multi-flow may have a same form, or may have different forms. The one or more per-hop shapers 106 are usually configured to perform per-hop regulation on the single flow or the multi-flow before or after a corresponding forwarding unit 105 forwards the single flow or the multi-flow. The multi-flow is formed by converging a plurality of single flows that flow through the forwarding unit 105. Traffic shaping may avoid a congestion packet loss caused by traffic convergence or hop-by-hop transmission of burst traffic. The network may further include a network control unit 101 configured to manage and control one or more of the forwarding units 105, the ingress shaper 104, and the per-hop shaper 106 on any network node in an end-to-end network transmission process. The management and control may include, for example, configuring a shaping parameter of the ingress shaper 104, and shaping parameters for the one or more per-hop shapers 106, and allocating and/or the per-hop regulating buffer sizes of the one or more forwarding units 105. In another possible design, in addition to controlling the foregoing units, the network control unit 101 may also control the sending unit 102 and/or the receiving unit 103 together, to control and manage traffic sending and receiving.

The network structure is merely a possible implementation form. In some possible designs, the sending unit 102 and the ingress shaper 104 may be integrated into a same device, for example, an end sending node configured to send traffic, the ingress shaper 104 and a first forwarding unit 105 in a traffic transmission process are integrated into a same device, for example, a first forwarding node that forwards the traffic, or the ingress shaper 104 and the receiving unit 103 are integrated into a same device, for example, an end receiving node configured to receive traffic. Likewise, the per-hop shaper 106 and the forwarding unit 105 may also be integrated into a same device. In some cases, the sending unit 102, the ingress shaper 104, the forwarding unit 105, and the receiving unit 103 may all be integrated into a same device. In this case, the per-hop shaper 106 may not be required, but the ingress shaper 104 independently completes a shaping operation. In some possible designs, the network control unit 101 may further control the sending unit 102 and the receiving unit 103, and perform control such as shaping parameter configuration and/or buffer allocation on the sending unit 102 and the receiving unit 103. The network control unit 101 may be independently deployed, namely, physically independent of another controlled functional unit (such as the sending unit 102, the forwarding unit 105, or the ingress shaper 104) in the network. The network control unit 101 and a functional unit may be further integrated into a same device, or even be divided into several subunits and arranged on a plurality of devices, as long as corresponding management and control functions can be logically implemented together.

The network control unit 101, the sending unit 102, the receiving unit 103, the forwarding unit 105, the ingress shaper 104, or the per-hop shaper 106 may be implemented in a form of hardware, software, or a combination of software and hardware, may be implemented as an independent device, for example, may be used as an independent node in the network, or may be one function module or a combination of a plurality of function modules on a network node. This may be selected and designed based on a specific scenario requirement. One or more of the ingress shaper 104 and the per-hop shaper 106 may perform a same shaping policy, or may perform different shaping policies. The per-hop shaper 106 may be configured for all the forwarding units 105, may be configured for only some forwarding units 105, or may not be configured for any forwarding unit 105.

In many service application scenarios, for example, in a 5G URLLC service scenario, specifically, in an industrial automation scenario, a vehicle-mounted network scenario, and the like, a corresponding 5G bearer network may be required to provide a bound data plane storage forwarding latency. However, an existing network shaper is mainly used to constrain an average bandwidth of traffic. An input parameter of the shaper is mainly determined based on a requirement such as a user traffic contract, without considering a forwarding latency status of the data traffic. In addition, the parameter is set comparatively fixedly, and adjustment cannot be flexibly and adaptively performed based on data transmission in a network to meet an actual network requirement. An embodiment of this application provides a bound latency-based network shaper configuration method 300, to determine and adjust a shaper parameter, and ensure that a network latency of data traffic after being shaped by a shaper satisfies a service latency constraint.

The shaper at a traffic ingress needs to adapt to a specific network scheduling policy. The network scheduling policy may be time synchronization-based, or time asynchronization-based. For example, the time asynchronization-based network scheduling policy may be quality of service (QoS)-based. For the time synchronization-based network scheduling policy, a set of self-designed mechanism may be usually used to ensure that traffic transmission in a network has a deterministic bound latency, and a value of the bound latency may be obtained. Therefore, the parameter of the shaper may be determined or adjusted based on the obtained bound latency value. For the time asynchronization-based, such as the quality of service-based network scheduling policy, although a one-way or two-way transmission latency of Internet Protocol (IP) traffic on a specific path may be obtained in a conventional measurement performance metric manner, a measured latency is only a measurement result of one time. A latency upper bound of the traffic is difficult to be measured, and further, a bound latency result cannot be obtained to adjust the parameter of the shaper. Therefore, a latency service level agreement (SLA) guarantee cannot be provided. For a traffic forwarding scenario that requires the bound latency, for example, when the quality of service-based network scheduling policy is used, an end-to-end latency upper bound from a sending unit to a receiving unit may be calculated based on network calculus, and is used as a reference indicator for configuring the shaper and satisfying the service SLA.

Figure 2:
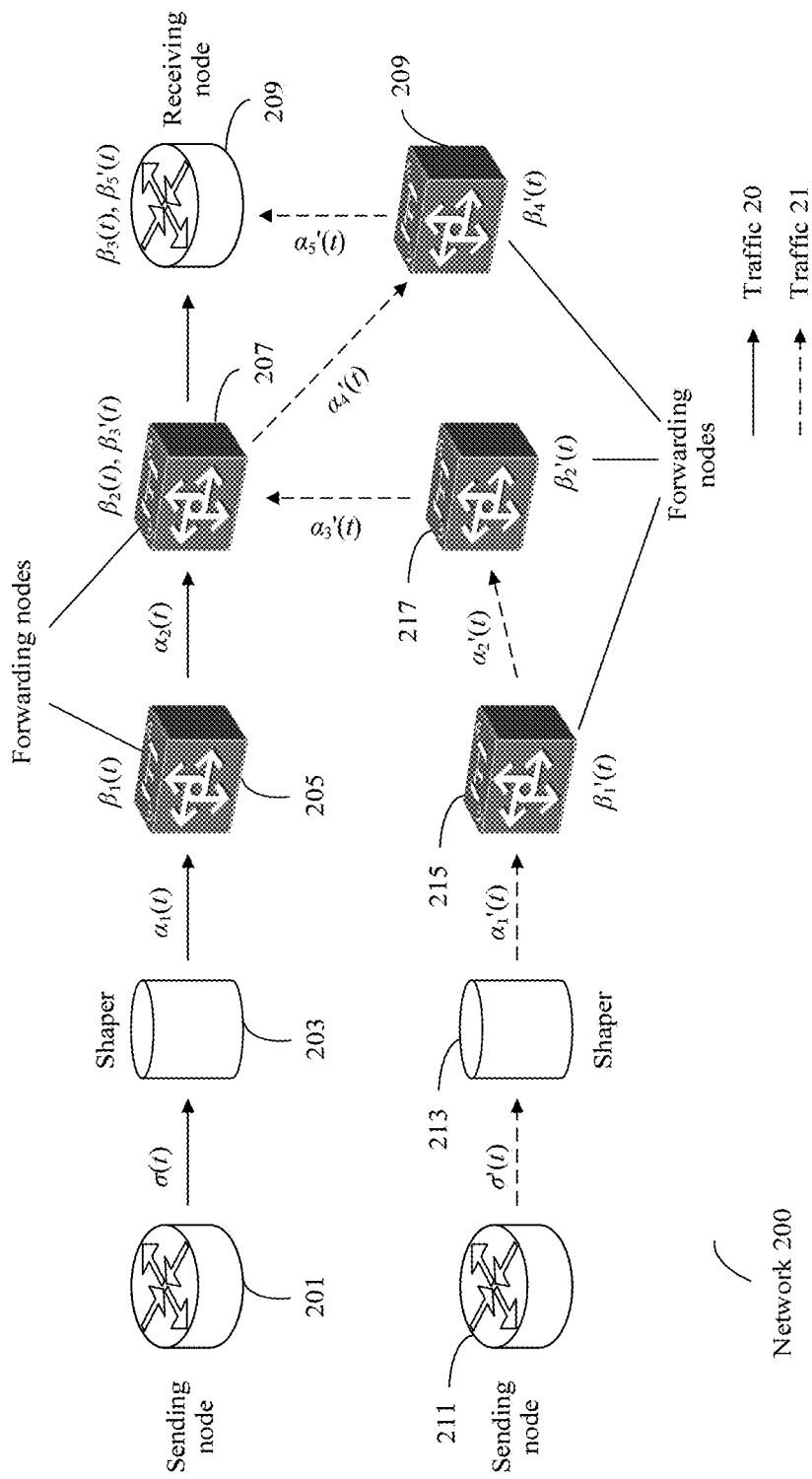
FIG. 2 is a schematic diagram of a network structure for transmitting traffic according to an embodiment of this application.

FIG. 2 shows a network 200 for transmitting data traffic. The network 200 includes sending nodes 201 and 211. Traffic 20 is sent from a sending node 201, and is sequentially sent to a receiving node 209 along forwarding nodes 205 and 207 after being shaped by a shaper 203. Traffic 21 is sent from a sending node 211, and is sequentially sent to the receiving node 209 along forwarding nodes 215, 217, and 219 after being shaped by a shaper 213. In an embodiment, the sending nodes 201 and 211 may respectively include the sending unit 102 shown in FIG. 1, forwarding nodes through which the traffic 20 and the traffic 21 respectively flow may respectively include the forwarding unit 105 shown in FIG. 1, and the receiving nodes 209 and 219 may respectively include the receiving unit 103 shown in FIG. 1. The shapers 203 and 213 may be implemented as the ingress shaper 104. Therefore, in this embodiment, for example, a network control node (not shown in the figure) including the network control unit 101 shown in FIG. 1 can control shaping parameter configuration of the shaper 203 such that the traffic 20 is shaped on the shaper 203 based on a configured parameter. Likewise, the network control node may also control shaping parameter configuration of the shaper 213.

It should be noted that FIG. 2 shows only a possible network structure for forwarding the traffic. In the network structure, because the sending unit 102, the ingress shaper 104, the plurality of forwarding units 105, and the receiving unit 103 that are configured to transmit the traffic 20 are separately located on different network nodes. Therefore, from a perspective of a network node structure, the traffic 20 successively completes a forwarding process in a sequence of network nodes 201, 203, 205, 207, and 209. However, in some other possible designs, as described above, one or more of the sending unit 102, the ingress shaper 104, the one or more forwarding units 105, and the receiving unit 103 may be located on a same network node. For example, when the sending unit 102 and the ingress shaper 104 both are located on the sending node 201, two forwarding units 105 are located on the forwarding node 205, and the receiving unit 103 is located on the receiving node 209, from a perspective of the network node structure, the traffic is forwarded in a sequence of network nodes 201, 205, and 209. However, from a perspective of a network unit structure, the two network node structures actually complete an end-to-end traffic forwarding process in a sequence of network units 102, 104, 105 (1), 105 (2), and 103. In other words, although structures of entity network nodes that forward the traffic may be different, as long as the traffic is actually forwarded in a sequence along a same network unit structure, end-to-end transmission paths of the traffic are the same.

The network 200 shown in FIG. 2 for transmitting the data traffic is used as an example. Based on a time asynchronization scheduling technology and a time synchronization scheduling technology to which the shaper adapt, the bound latency-based ingress shaper configuration method at the foregoing two cases, in particular, how to obtain a result of a bound latency value, is described in detail with reference to ingress shaper parameter configuration.

Case 1. The shaper adapts to the time asynchronization-based network scheduling policy.

Figure 3:
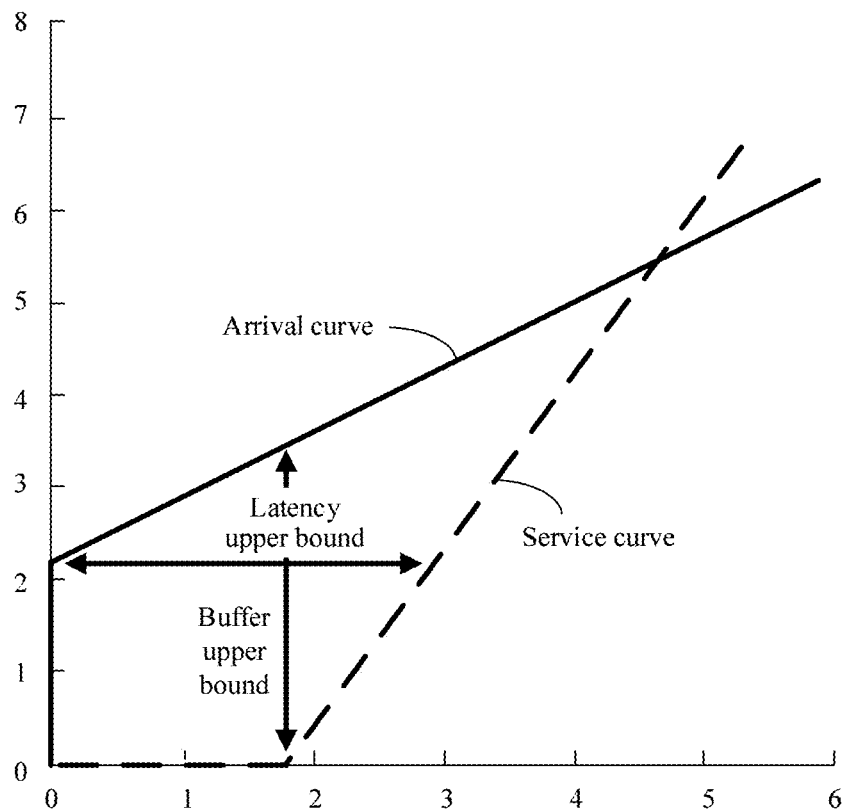
FIG. 3 is a schematic diagram of a network calculus model according to an embodiment of this application.

Network calculation is a method for calculating an end-to-end deterministic latency upper bound for a communications network. An upper bound of an input traffic data volume at a network node in any time period T is described as an arrival curve, and is related to factors such as a service traffic model and a source-end shaping model. For example, a sending period, a maximum burst size, a maximum sending rate, a peak rate, and a maximum packet length may be included. A lower bound of a forwarding capability of a network node in any time period is abstracted as a service curve, and is related to parameters such as a scheduling method used by the node, a device, and network configuration. For example, a device scheduling mechanism, a maximum packet length, and/or a port rate may be included. It is assumed that one piece of data traffic in a network successively flows through M forwarding nodes. The curves $\alpha_n(t)$ and $\beta_n(t)$ respectively represent an arrival curve and a service curve of an $n^{th}$ node in the M forwarding nodes, where $1 \leq n \leq M$, $M \geq 1$, t represents any moment in the time period T, and $0 < t \leq T$. A maximum horizontal distance between the service curve and the arrival curve at the $n^{th}$ node in the time period T is a latency upper bound of the traffic sent by the node, and a maximum vertical distance between the service curve and the arrival curve represents a buffer upper bound of the traffic sent by the node, as shown in FIG. 3.

A method for calculating the end-to-end latency upper bound based on the network calculation is described using end-to-end transmission of the traffic 20 in the network structure shown in FIG. 2 as an example. After the traffic 20 is sent from the sending node 201, an initial curve for the traffic 20 that is not shaped is (t). Then, a curve $\alpha_1(t)$ is obtained after the shaped traffic 20 flows through the shaper 203, where $\alpha_1(t)$ is an arrival curve at the forwarding node 205. A lower bound of a data forwarding capability that can be provided by the forwarding node 205 is a service curve $\beta_1(t)$ at the node. After the traffic 20 flows into the forwarding node 205, the forwarding node 205 continues to forward the traffic 20 to the next forwarding node 207. An arrival curve for the traffic 20 at the forwarding node 207 is $\alpha_2(t)$, and a service curve at the forwarding node 207 is $\beta_2(t)$. The traffic 20 continues to be forwarded by the forwarding node 207 to the receiving node 209, and an arrival curve for the traffic 20 finally received by the receiving node 209 is $\alpha_3(t)$.

There are a plurality of methods for calculating the end-to-end traffic latency upper bound based on a network calculus principle, for example, a separate flow analysis (SFA) method, a pay multiplexing only once (PMOO) analysis method, and a total flow analysis (TFA) method. A manner used for calculating an arrival curve $\alpha_n(t)$ and/or a service curve $\beta_n(t)$ at each node in different methods may be different. Manners for calculating the end-to-end flow latency upper bound based on the arrival curve and the service curve may also be different in the different methods. An end-to-end transmission process of the traffic 20 shown in FIG. 2 is still used as an example. At least the following two methods may be used to calculate the end-to-end latency upper bound of the traffic.

Manner 1. An overall arrival curve $\alpha(t)$ and an overall service curve $\beta(t)$ of the end-to-end traffic flowing through all the N (N≥1) forwarding nodes are separately calculated, and a maximum horizontal distance between $\alpha(t)$ and $\beta(t)$ is calculated, to determine the latency upper bound (DB) of the end-to-end traffic.

In the manner, a piece of end-to-end traffic is directly used as an object. The arrival curve (t) for the piece of traffic is expressed by an arrival curve $\alpha_1(t)$ at a first forwarding node in the network, namely, $\alpha(t)=\alpha_1(t)$. The service curve (t) for the end-to-end traffic is obtained by performing a mini-sum convolution operation on single-point service curves $\beta_n(t)$ (n=1, 2, ..., N) at all forwarding nodes in the network.

A formula for calculating mini-sum convolution between single-point service curves at any two forwarding nodes is first defined as follows $$\beta_{f,g}(t)=(\beta_f \otimes \beta_g)(t)=\inf\_\{0 \leq s \leq t\}(\beta_f((t-s))+\beta_g(s)) \quad \text{Formula (1.1)}.$$

At any given moment t, all s∈[0, t] are traversed to solve an infimum value of $\beta_f((t-s))+\beta_g(s)$. The calculated infimum value is used as a result of the mini-sum convolution operation $(\beta_f \otimes \beta_g)(t)$, returned at the moment t. (t) and (t) represent service curve functions of any two forwarding nodes $\beta_f$ and $\beta_g$. The function is a non-decreasing function. s is an intermediate variable, and may be any value in [0, t]. inf_ represents calculating an infimum (infimum). For example, inf_{E}(x(E)) represents calculating an infimum of a function x(E) whose value is in a set E.

Based on the Formula 1.1, for the data traffic flowing through the N forwarding nodes in the network, single-point service curves of the nodes are respectively $\beta_1(t)$, $\beta_2(t)$, ..., and $\beta_N(t)$. A formula for calculating the end-to-end service curve $\beta(t)$ for the data traffic is as follows $$\beta_{1,2}(t)=(\beta_1 \otimes \beta_2)(t)=\inf\_\{0 \leq s \leq t\}(\beta_1(t-s)+\beta_2(s)),$$

$$\beta_{1,2,3}(t)=(\beta_{1,2} \otimes \beta_3)(t)=\inf\_\{0 \leq s \leq t\}(\beta_{1,2}(t-s)+\beta_3(s)) \quad \text{Formula (1.2)},$$

$$(t)=\beta_{1,2,\ldots,N}(t)=(\beta_{1,2,\ldots,(N-1)} \otimes \beta_N)(t)=\inf\_\{0 \leq s \leq t\}(\beta_{1,2\ldots,(N-1)}(t-s)+\beta_N(s)).$$

For example, for the traffic 20, the arrival curve (t)=$\alpha_1(t)$, and the service curve $\beta(t)=(\beta_1 \otimes \beta_2)(t)=\inf\_\{0 \leq s \leq t\}(\beta_1(t-s)+\beta_2(s))$.

The maximum horizontal distance between (t) and (t) is calculated to obtain the latency upper bound of the traffic 20, namely, DB=Max_Hdis ((t), (t)).

Manner 2. Arrival curves $\alpha_n(t)$ and service curves $\beta_n(t)$ of the end-to-end traffic flowing through all the N (N≥1) forwarding nodes are separately calculated, and a maximum horizontal distance between $\alpha_n(t)$ and $\beta_n(t)$ is calculated, to determine that a latency upper bound $db_n$ of the traffic at each forwarding node is Max_Hdis ($\alpha_n(t)$, $\beta_n(t)$). Summation is performed on the latency upper bound $db_n$ of each forwarding node, to obtain that the latency upper bound DB of the end-to-end traffic is SUM($db_1$, ..., $db_n$) through calculation, where n=1, 2, ..., N.

For example, as shown in FIG. 2, the arrival curve and the service curve for the traffic 20 at the forwarding node 205 are respectively $\alpha_1(t)$ and $\beta_1(t)$, and the arrival curve and the service curve for the traffic 20 at the forwarding node 207 are respectively $\alpha_2(t)$ and $\beta_2(t)$. Then, a latency upper bound $db_1$ of the traffic 20 at the forwarding node 205 is calculated as Max_Hdis ($\alpha_1(t)$, $\beta_1(t)$), and a latency upper bound $db_2$ of the traffic 20 on the forwarding node 207 is calculated as Max_Hdis ($\alpha_2(t)$, $\beta_2(t)$), to obtain that the end-to-end flow latency upper bound DB of the traffic 20 is $db_1+db_2$ through calculation accordingly.

Similar to the method for calculating the end-to-end latency upper bound of the traffic 20, an end-to-end latency upper bound of the traffic 21 in FIG. 2 may also be calculated using Manner 1 or Manner 2. In Manner 1 and Manner 2, only the arrival curve and the service curve at each forwarding node are considered when the arrival curve (t) and the service curve (t) for the traffic are calculated. For example, for the traffic 20 in FIG. 2, when the service curve $\beta(t)$ is calculated using Manner 1, a convolution operation is performed only on single-point service curves at the forwarding nodes 205 and 207 that forward the traffic 20, namely, $\beta(t)=(\beta_1 \otimes \beta_2)(t)$, without considering the service curve at the receiving node 209. This may be applied to a case in which the traffic 20 is terminated at the receiving node 209. For example, the traffic 20 is forwarded only within an autonomous system (AS) domain to the receiving node 209 at an edge. This is also applied to a case in which although the traffic 20 further needs to be continuously forwarded to another node using the receiving node 209, a previous latency value does not need to be considered for subsequent forwarding of the traffic 20. For example, after the traffic 20 is received by the receiving node 209, the receiving node 209 continues to forward the traffic 20 to the other node in the network. However, when the traffic 20 is forwarded to the other node, the previous latency of the traffic 20 does not need to be accumulated. It should be noted that the foregoing case is merely used as an example, and does not constitute a specific limitation on an application scenario in which the end-to-end latency upper bound is calculated using Manner 1 and Manner 2.

In another embodiment of this application, after the traffic 20 is received by the receiving node 209, the traffic 20 may further need to be forwarded to another node in the network, and the other node needs to obtain a latency upper bound calculation result of a previous hop. For example, the receiving node 209 is an edge node in an AS domain, and the receiving node 209 forwards the received traffic 20 to an edge node in another AS domain. A network control node in the other AS domain performs more accurate and effective control on transmission quality of a data flow in the AS domain. A transmission latency of the traffic 20 in the previous AS domain may need to be accumulated. In this case, when the end-to-end latency upper bound of the traffic 20 in the AS domain in which the network 200 is located is calculated, a latency of the traffic 20 at the receiving node 209 needs to be considered. When the latency at the receiving node 209 is considered, the following Manner 3 or Manner 4 may be used to calculate the end-to-end latency upper bound of the traffic.

Manner 3. An overall arrival curve $\alpha(t)$ and an overall service curve $\beta(t)$ of the end-to-end traffic flowing through all the N (N≥1) forwarding nodes are separately calculated, and a maximum horizontal distance between α(t) and β(t) is calculated, to determine the latency upper bound DB of the end-to-end traffic.

In the manner, a piece of end-to-end traffic is directly used as an object. The arrival curve (t) for the piece of traffic is expressed by an arrival curve $\alpha_1(t)$ at a first forwarding node in the network, namely, $\alpha(t)=\alpha_1(t)$. The service curve (t) for the end-to-end traffic is obtained by performing a mini-sum convolution operation on a single-point service curve $\beta_n(t)$ (n=1, 2, . . . , N) at the N forwarding nodes in the network and a single-point service curve $\beta_{N+1}(t)$ at a receiving node.

For example, the arrival curve (t) for the traffic 20 is $\alpha_1(t)$, and the service curve β(t) for the traffic 20 is $\beta_{1,2,3}(t) = (\beta_{1,2} \otimes \beta_3)(t)$. In other words, when the overall service curve β(t) for the traffic is calculated, the mini-sum convolution operation is performed on single-point service curves at the forwarding node 205, the forwarding node 207, and the receiving node 209, instead of performing the mini-sum convolution operation only on the single-point service curves at the forwarding nodes 205 and 207 in Manner 1.

The maximum horizontal distance between (t) and (t) is calculated to obtain the latency upper bound of the traffic 20, namely, DB=Max_Hdis ((t), (t)).

Manner 4. An arrival curve $\alpha_n(t)$ and a service curve $\beta_n(t)$ (n=1, . . . , N) of the end-to-end traffic flowing through all the N forwarding nodes, and an arrival curve $\alpha_{(N+1)}(t)$ and a service curve $\beta_{(N+1)}(t)$ at a receiving node are separately calculated. A maximum horizontal distance between the arrival curve and the service curve corresponding to each node is separately calculated, to determine the latency upper bound $db_m$ of the traffic at the N forwarding nodes and the receiving node is Max_Hdis ($\alpha_m(t)$, $\beta_m(t)$) (m=1, . . . , N, N+1). Summation is performed on the latency upper bound of each the forwarding node, to obtain that the latency upper bound DB of the end-to-end traffic is SUM($db_1$, . . . , $db_n$, $db_{n+1}$) through calculation accordingly.

For example, as shown in FIG. 2, the arrival curve and the service curve for the traffic 20 at the forwarding node 205 are respectively $\alpha_1(t)$ and $\beta_1(t)$, the arrival curve and the service curve for the traffic 20 at the forwarding node 207 are respectively $\alpha_2(t)$ and $\beta_2(t)$, and the arrival curve and the service curve for the traffic 20 at the receiving node 209 are respectively $\alpha_3(t)$ and $\beta_3(t)$. Then, a latency upper bound $db_1$ of the traffic 20 at the forwarding node 205 is calculated as Max_Hdis ($\alpha_1(t)$, $\beta_1(t)$), a latency upper bound $db_2$ of the traffic 20 at the forwarding node 207 is calculated as Max_Hdis($\alpha_2(t)$–$\beta_2(t)$), and a latency upper bound $db_3$ of the traffic 20 at the receiving node 209 is calculated as Max_Hdis($\alpha_3(t)$, $\beta_3(t)$), to obtain that the end-to-end flow latency upper bound DB of the traffic 20 is $db_1+db_2+db_3$ through calculation accordingly.

For the traffic 21 shown in FIG. 2, any one of Manner 1 to Manner 4 may also be used to calculate the end-to-end latency upper bound of the traffic. It should be noted that, in an embodiment, each network node may play different roles or have different forwarding locations when sending different data flows. The played roles include, for example, a sending node, a forwarding node, and/or a receiving node. For example, the node 201 is a sending node for the traffic 20, but may play a role of a forwarding node or a receiving node for other traffic in the network 200. The different forwarding locations indicate that a same network node may be in different forwarding hops when forwarding the different data flows. For example, in FIG. 2, the forwarding node 207 is at a second-hop forwarding location for the traffic 20, and is at a third-hop forwarding location for the traffic 21. Therefore, when the same network node sends or receives different traffic, arrival curves and service curves may be different. For example, when forwarding the traffic 20, the forwarding node 207 is used as the second-hop forwarding node, and the arrival curve and the service curve are respectively $\alpha_2(t)$ and $\beta_2(t)$. When forwarding the traffic 21, the forwarding node 207 is used as the third-hop forwarding node, and an arrival curve and a service curve are respectively $\alpha_3'(t)$ and $\beta_3'(t)$.

Manner 1 to Manner 4 are merely used as examples. In an embodiment, another method for calculating the end-to-end latency based on the network calculus may also be selected.

Manner 1 to Manner 4 describe methods for calculating the end-to-end latency of the single flow. In some other cases, a sending node may also need to send a plurality of pieces of traffic of a same form. The plurality of pieces of traffic are aggregated by the sending node to form one piece of aggregated traffic. After the aggregated traffic aggregated from the plurality of pieces of traffic is shaped by an ingress shaper, an arrival curve for the aggregated traffic is an aggregated arrival curve determined based on arrival curves for the plurality of pieces of traffic. For example, an arrival curve for the aggregated traffic that satisfies a linear form and that is shaped at an ingress is determined by a sum $\Sigma_{i=1}^{M} \alpha_1^i(t)$ of arrival curves for the plurality of pieces of traffic that are of the aggregated traffic and that are shaped at the ingress, where M is a quantity of single flows aggregated at the sending node, $\alpha_1^i(t)$ is an arrival curve for a single flow before an $i^{th}$ piece of data is aggregated, and i=1, . . . , M. For a manner for calculating $\alpha_1^i(t)$, refer to the foregoing case for the single flow.

Figure 4:
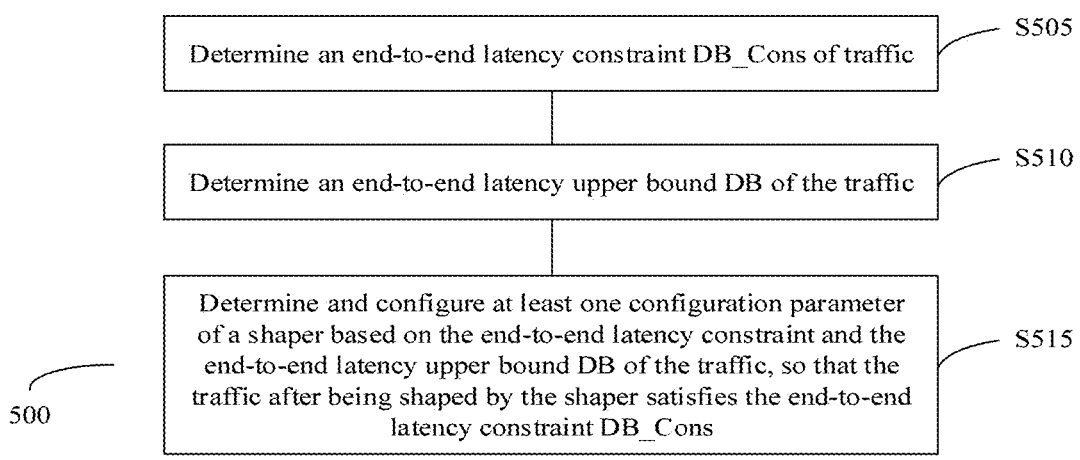
FIG. 4 is a schematic flowchart of a network shaper configuration method according to an embodiment of this application.

For traffic forwarding using a time asynchronization-based network scheduling policy, an embodiment of this application provides a network shaper configuration method 500 that ensures a bound latency. A shaper parameter is configured based on a service latency constraint, to ensure that an end-to-end latency upper bound transmitted by traffic determined based on network calculation satisfies the service latency constraint. As shown in FIG. 4, the method 500 includes the following content.

S505. Determine the end-to-end latency constraint DB_Cons of the traffic.

Network latency constraints DB_Cons of different traffic may be different in a network, and may be related to a service type carried by the traffic, a transmission rate requirement for the traffic in a specific time period, or another possible network data transmission requirement. In a network using the time asynchronization-based network scheduling policy, the latency constraint of the traffic is usually related to the service type carried by the traffic. The different traffic may carry different service types. The different service types may also have different latency constraints in the network. For the traffic flowing through the network using the time asynchronization-based scheduling policy, the latency constraint DB_Cons that the traffic should satisfy may be determined based on a constraint of the network on the service type carried by the traffic. Latency constraint values DB_Cons corresponding to the different service types may be pre-stored, for example, may be stored in the network control unit 101, in the sending unit 102, the receiving unit 103, or any other possible storage location shown in FIG. 1, which may be set as required. In an embodiment, for the traffic forwarding using the time asynchronization-based network scheduling policy, the latency constraint DB_Cons of the current traffic may be determined based on a specific network data transmission requirement. In an embodiment, for example, the network latency constraint DB_Cons may be automatically obtained by a network management device based on a correspondence between a service type and a latency constraint, or may be manually configured by a network administrator.

S510. Determine the end-to-end latency upper bound DB of the traffic.

The end-to-end latency upper bound DB of the traffic is determined based on a network calculus algorithm. Before the shaper parameter is configured, a corresponding latency upper bound expression function may be determined using an arrival curve function and a service curve function that are based on the foregoing various network calculus algorithms, and is used as an expression of the end-to-end latency upper bound DB. For example, for a manner for determining the expression, refer to any one of Manner 1 to Manner 4 for calculating the end-to-end latency upper bound based on the network calculus algorithm.

S515. Determine and configure at least one configuration parameter of the shaper based on the end-to-end latency constraint DB_Cons and the end-to-end latency upper bound DB of the traffic such that the traffic after being shaped by the shaper satisfies the end-to-end latency constraint DB_Cons.

For traffic transmission using the time asynchronization-based network scheduling policy, an actual latency of the traffic may be determined based on the end-to-end latency upper bound of the traffic. In an example, ensuring that the traffic satisfies the latency constraint DB_Cons needs to ensure that the end-to-end latency upper bound DB of the traffic after being shaped by the ingress shaper does not exceed the latency constraint DB_Cons. Therefore, it may be considered that the latency constraint DB_Cons is used as a calculation result of the end-to-end latency upper bound DB of the traffic, and a related parameter configuration of the ingress shaper is determined with reference to a calculation formula of the end-to-end latency upper bound of the traffic.

The end-to-end latency upper bound after shaping is performed at an ingress can be calculated based on a network calculation method. The shaper shapes the traffic at the ingress such that output traffic after being shaped satisfies an initial curve (t). A specific form of (t) may be determined by a shaper model used at the ingress. An ingress shaper adapted to the time asynchronization-based network scheduling policy uses, for example, a token bucket model, which includes a single-bucket model, a dual-bucket model, or the like. The token bucket model may use a strict priority (SP) algorithm, a round robin (RR) algorithm, a weighted fair queuing (WFQ) algorithm, a credit-based shaper (CBS) defined in the Institute of Electrical and Electronics Engineers (IEEE) 802.1 Qav, and the like. In an embodiment, another shaping algorithm adapted to the time asynchronization-based network scheduling policy may also be selected as required.

The initial curve (t) after the shaping is performed at the ingress may include one or more configurable parameters. A specific quantity and meanings of the parameters may be determined based on a model type selected by the shaper. A parameter set $S=\{s_1, s_2, \ldots s_n, n \geq 1\}$ of the shaper is defined. All or some parameters in the parameter set S may be determined and configured based on the latency constraint DB_Cons. Under a condition that the end-to-end latency upper bound DB of the traffic after being shaped by a specific shaper model satisfies the latency constraint DB_Cons, for example, under a condition that a constraint DB≤DB_Cons is satisfied, values of the all or some parameters in the parameter set S of the specific shaper model are determined. In order to determine a parameter value of the specific shaper model when the constraint DB≤DB_Cons is satisfied, the expression of the end-to-end latency upper bound DB of the traffic in the specific shaper model needs to be determined based on the network calculus. In some cases, the initial curve (t) may be used as a single-point arrival curve at a first forwarding node that receives the traffic. FIG. 2 is still used as an example. The traffic 20 sent from the sending node 201 enters the shaper 203 at the ingress. The sending node 201 includes the sending unit 102 shown in FIG. 1, and is configured to send the traffic 20 from the sending node 201. The initial curve (t) for the traffic 20 is a single-point arrival curve $\alpha_1(t)$ at the first forwarding node 205 that receives the traffic, namely, satisfies $\alpha_1(t)=\sigma(t)$. In another possible case, a single-point arrival curve $\alpha_1(t)$ at the first forwarding node 205 is not the same as the initial curve $\sigma(t)$, but may have a specific association relationship. In some cases, according to a sequence in which the traffic flows, a single-point arrival curve at each post-network node may be associated with an initial curve after the shaping is performed and a single-point arrival curve at each pre-network node. For example, a single-point arrival curve $\alpha_3(t)$ for the traffic 20 at the receiving node 209 may be associated with the initial curve $\sigma(t)$, the single-point arrival curve $\alpha_1(t)$ at the forwarding node 205, and a single-point arrival curve $\alpha_2(t)$ at the forwarding node 207. A single-point service curve at each network node through which the traffic flows may be related to a service capability that can be provided by the node, and may be affected by factors such as a node port bandwidth and a scheduling policy of the node. The described factors that affect the single-point arrival curve and the service curve at the network node are only examples. A specific calculation method can be selected or adjusted as required, as long as an arrival curve and a service curve at a required network node can be appropriately determined, to obtain the end-to-end latency upper bound of the traffic through calculation.

In a possible embodiment, Manner 1 or Manner 3 may be used to determine the expression of the end-to-end latency upper bound of the traffic. In this case, the flow latency upper bound of the traffic is as follows $$DB = \text{Max\_Hdis}(\alpha(t), \beta(t)) = \text{Max}_t(u: \alpha(t) = \beta(t+u)). \quad \text{Formula (1.3)}$$

In the formula, $$\text{Max}_t(u: \alpha(t) = \beta(t+u))$$

is specific expansion for calculating the end-to-end latency upper bound Max_Hdis($\alpha(t)$, $\beta(t)$) based on the arrival curve (t) and the service curve (t) for the traffic. The expansion represents traversing all time points t within a specific time period, obtaining a parameter u at each time point t to satisfy an equation $\alpha(t)=\beta(t+u)$, and obtaining a maximum value of all parameters u as the latency upper bound DB.

One or more parameters of the ingress shaper are determined based on the constraint DB≤DB_Cons and are configured such that the shaper shapes the traffic based on a determined configuration parameter value, thereby satisfying the latency constraint DB_Cons of the traffic. In a possible design, all parameters of the shaper are determined based on the latency constraint DB_Cons. Alternatively, only some parameters of the shaper may be determined based on the latency constraint DB_Cons, and a remaining parameter of the shaper may be preset, or determined based on another condition, for example, determined based on a basic service requirement, and/or determined based on another performance indicator except the latency of a forwarding node through which the traffic flows.

Figure 5A:
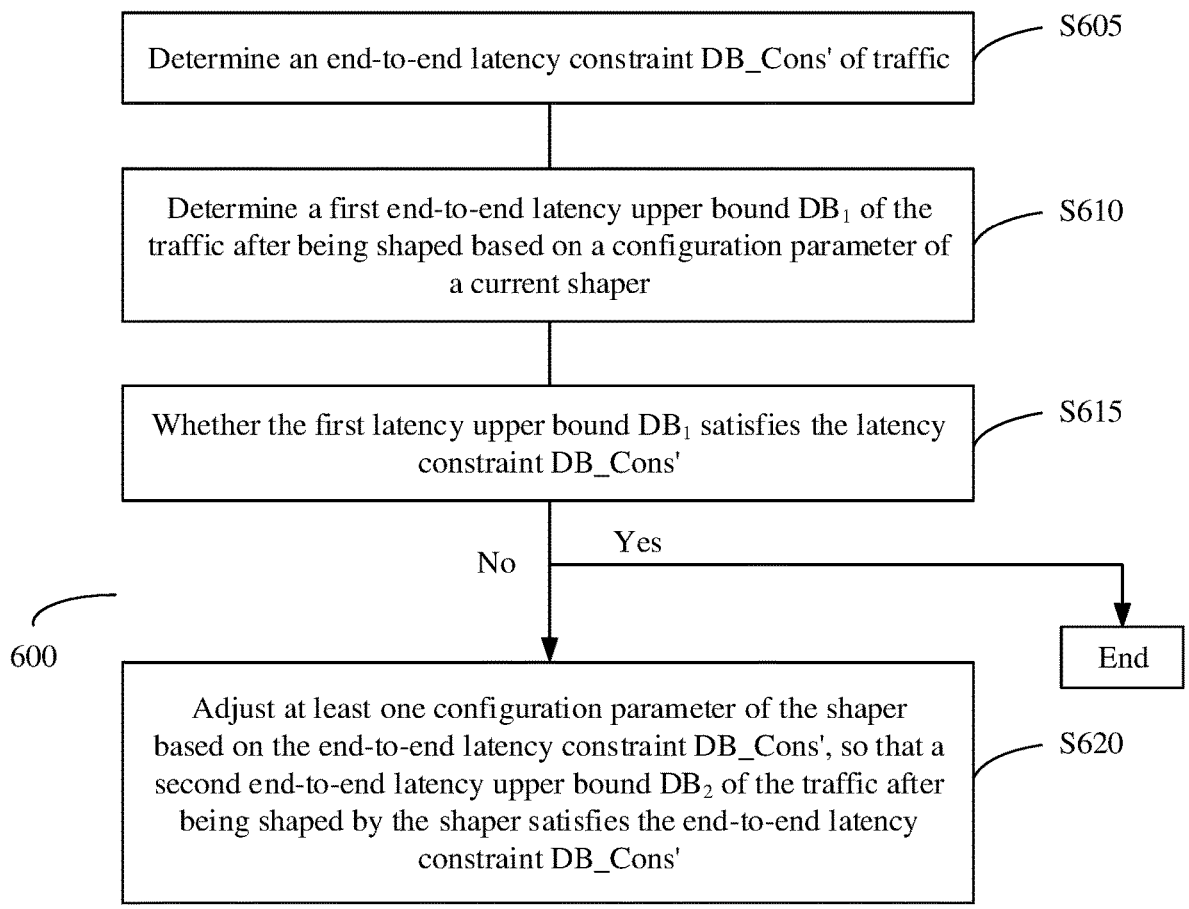
FIG. 5A is a schematic flowchart of a network shaper configuration method according to an embodiment of this application.

In some cases, for example, when the service type carried by the traffic flowing into the shaper changes, or although the service type carried by the traffic does not change, a latency requirement for a same service type changes, the latency constraint that the traffic needs to satisfy may change. As a result, for example, after the shaping is performed based on the configuration parameter determined using the method 500, the end-to-end latency upper bound of the traffic no longer satisfies a new service latency constraint. In another embodiment of this application, when finding that the end-to-end latency upper bound of the traffic after being shaped based on a current configuration parameter no longer satisfies the service latency constraint, a network control node may further adjust the one or more of the configuration parameters of the ingress shaper such that the end-to-end latency upper bound of the traffic after being shaped based on an adjusted configuration parameter can satisfy the service latency constraint. A method 600 for adjusting a configuration parameter of the shaper includes the following content, as shown in FIG. 5A.

S605. Determine an end-to-end latency constraint DB_Cons' of traffic.

It is assumed that a redetermined latency constraint of the traffic is DB_Cons'. Because DB>DB_Cons', the end-to-end latency upper bound of the traffic after being shaped based on the current configuration parameter does not satisfy the new latency constraint requirement. Alternatively, in some cases, although the latency constraint DB_Cons corresponding to the traffic does not change, expected latency constraint satisfaction changes. For example, the current end-to-end latency upper bound value DB of the traffic is ⅘ of the latency constraint value DB_Cons, namely, DB=0.8× DB_Cons. However, the network control node expects to further optimize the end-to-end latency of the traffic. Actually, DB=0.6×DB_Cons is satisfied. In this case, the parameter of the shaper still needs to be adjusted, to satisfy the actual requirement for the traffic transmission and ensure a high-quality network service capability. In a possible design, the configuration parameter may also be adjusted on a basis of satisfying a basic latency constraint, for example, adjusted from DB=0.6×DB_Cons to DB=0.8×DB_Cons such that the latency upper bound value of the traffic after being shaped is at least closer to the latency constraint value DB_Cons than that before the adjustment. This saves a bandwidth while network service quality is ensured, to transmit higher-priority service traffic. Dissatisfaction of the latency constraint is caused in the foregoing situations, and the configuration parameters of the shaper need to be adjusted. For ease of description, DB_Cons' is uniformly used herein to indicate the new latency constraint that the traffic should actually satisfy. For example, when further optimization is expected for latency constraint satisfaction on a premise that the basic latency constraint DB_Cons is satisfied, the new latency constraint DB_Cons' that actually should be satisfied may be determined as 0.6×DB_Cons.

The foregoing case is merely used as an example. In an embodiment, the latency constraint of the traffic may be re-determined according to another requirement or a preset rule.

S610. Determine a first end-to-end latency upper bound $DB_1$ of the traffic after being shaped based on the configuration parameter of the current shaper.

FIG. 2 is still used as an example, the traffic 20 sent from the sending node 201 enters the ingress shaper 203. The shaper 203 shapes the traffic at the ingress based on a determined configuration parameter set $S_1$ of the current shaper such that output traffic 20 after being shaped satisfies the initial curve $\sigma_1(t)$. For the ingress shaper adapted to the time asynchronization-based network scheduling policy, the first end-to-end latency upper bound $DB_1$ of the traffic after being shaped is determined based on the network calculus. For example, the end-to-end latency upper bound of the traffic may be calculated using any one of Manner 1 to Manner 4. A method for calculating the end-to-end latency upper bound of the traffic may be fixed in a specific network. For example, a network calculation expression for calculating the latency upper bound $DB_1$ may be the same as a corresponding expression in the step S520, to ensure stability of service transmission of the network traffic.

In a possible design, when the latency upper bound of the traffic is calculated, results of single-point arrival curves and service curves that are at one or more network nodes through which the traffic flows and that are determined in a calculation process may be stored together. It should be noted that, calculation results of single-point curves at which network nodes are stored, and whether both a single-point arrival curve and a service curve or only one of a single-point arrival curve and a service curve is selected to store may be flexibly set as required. This is not specifically limited herein.

S615. Determine whether the first latency upper bound $DB_1$ satisfies the latency constraint DB_Cons', for example, $DB_1 \leq DB\_Cons'$, and if the first latency upper bound $DB_1$ does not satisfy the latency constraint DB_Cons', step S620 is performed, or if the first latency upper bound $DB_1$ satisfies the latency constraint DB_Cons', the method ends.

Determining whether the latency upper bound $DB_1$ determined in the step S610 satisfies the new service latency constraint is determining whether the condition $DB_1 \leq DB\_Cons'$ is satisfied. If the condition is unsatisfied, for example, if the flow latency upper bound $DB_1$ of the traffic 20 after being shaped based on the current parameter set $S_1$ of the shaper 203 is greater than the latency constraint value DB_Cons', it indicates that the traffic after being shaped based on the parameter of the current shaper does not satisfy the service latency requirement. The network service quality is affected. In this case, reshaping needs to be performed on the traffic 20 such that the end-to-end latency upper bound of the traffic 20 can satisfy the new service latency constraint, for example, satisfy $DB_1 \leq DB\_Cons'$. In this way, transmission of the traffic 20 is ensured to better adapt to a service scenario requirement. When it is determined that the reshaping needs to be performed on the traffic 20, the step S620 continues to be performed. When the flow latency upper bound of the traffic 20 satisfies $DB_1 \leq DB\_Cons'$, no adjustment may be made in this case, to ensure transmission stability of the data flow.

S620. Adjust at least one configuration parameter of the shaper based on the latency constraint DB_Cons' such that a second end-to-end latency upper bound $DB_2$ of the traffic after being shaped by the shaper satisfies the end-to-end latency constraint DB_Cons', namely, $DB_2 \leq DB\_Cons'$.

In the step S620, a manner of determining and adjusting one or more configuration parameters of the shaper based on the redetermined latency constraint DB_Cons' of the traffic is similar to the parameter configuration manner in the step S510. Details are not described herein again. It should be noted that, when an operation of adjusting a parameter set of the shaper is performed, any group of parameter set $S_1'$ that can satisfy a constraint $DB_2 \leq DB\_Cons'$ usually needs to be determined. The operation may be implemented by adjusting one or more shaping parameters in the parameter set $S_1$ of the shaper 203. A new adjusted parameter set is denoted as $S_1'$. However, in some cases, for example, when the further optimization is expected for the latency constraint satisfaction on the premise that the basic latency constraint $DB\_Cons$ is satisfied, a group of parameter set $S_1'$ may be directly determined in an ideal case such that $DB_2 = DB\_Cons'$. Alternatively, a group of parameter set $S_1'$ is determined such that $DB_2$ can be the closest to or at least closer to $DB\_Cons'$ on a premise that $DB_2$ is less than $DB\_Cons'$. In this case, the traffic after being shaped based on the adjusted shaper parameter set $S_1'$ conforms to a shaping curve $\sigma'(t)$, where $\sigma'(t) \neq \sigma(t)$.

If there are a plurality of shaper parameters that can be adjusted based on the latency constraint $DB\_Cons'$, all or some of the parameters may be adjusted based on a parameter meaning, a service scenario, and the like. Alternatively, one or more of the parameters may be first adjusted based on an adjustment difficulty, and if the latency constraint still cannot be satisfied, a plurality of other parameters are adjusted. A specific adjustment principle of the shaper parameter and a quantity of the adjusted shaper parameters can be set based on an actual requirement. In a possible design, on a basis that the one or more of the shaper parameters are adjusted based on the latency constraint, another parameter of the shaper may be further optimized based on another possible performance indicator of the network, for example, a forwarding capability of the forwarding node.

Figure 5B:
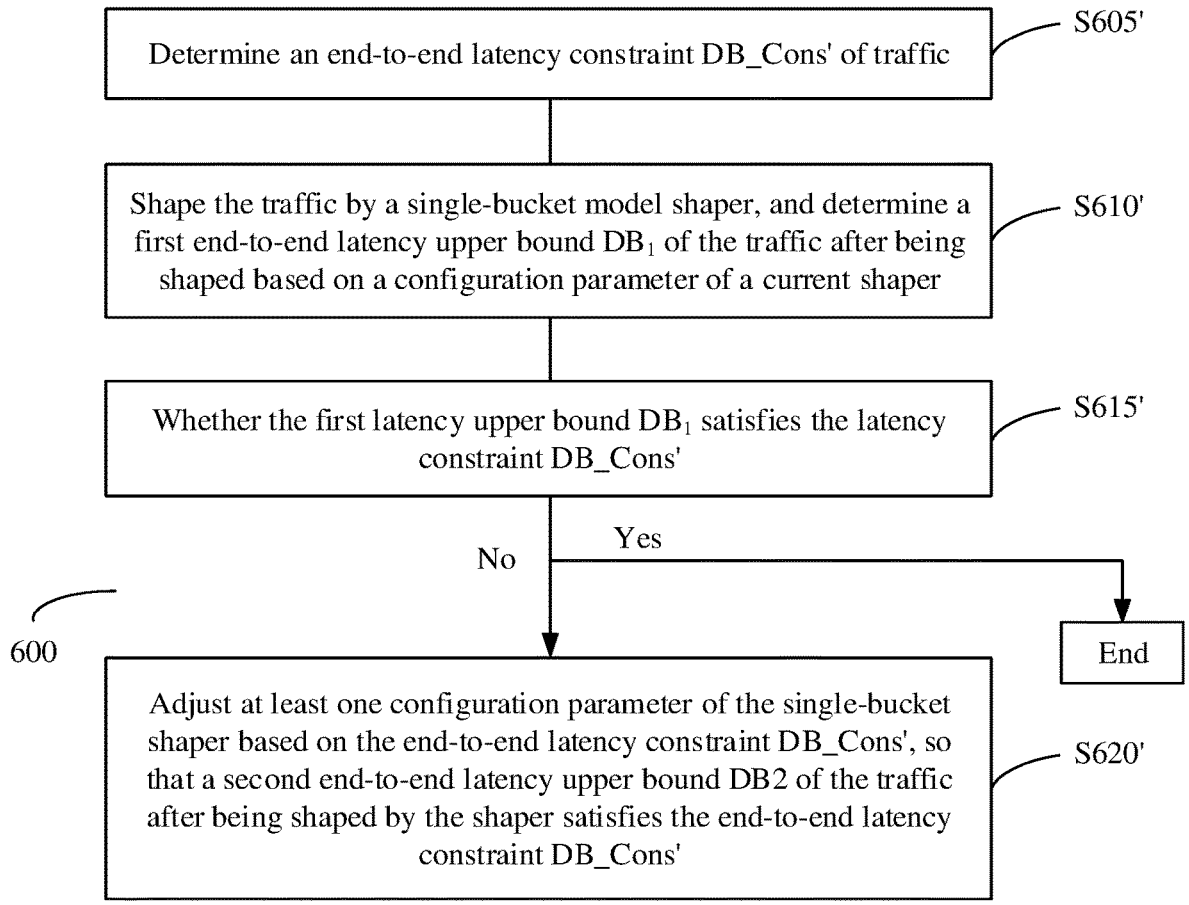
FIG. 5B is a schematic flowchart of a network shaper configuration method according to an embodiment of this application.

To describe a possible implementation of this application more clearly, the following describes in detail an adjustment method shown in FIG. 5B based on a case in which if the service latency constraint is unsatisfied, a configuration parameter using a single-bucket shaper model needs to be adjusted. The single-bucket shaper model adapts to the time asynchronization-based network scheduling policy. The method 600' includes the following content, as shown in FIG. 5B.

S605'. Determine an end-to-end latency constraint $DB\_Cons'$ of traffic.

FIG. 2 is still used as an example, and a network control node may be used to determine the latency constraint $DB\_Cons'$ of a service type carried by the traffic 20. Because a service type carried by pre-input traffic is different from the service type carried by the traffic 20, the latency constraint $DB\_Cons'$ corresponding to the traffic 20 needs to be re-determined.

S610'. Shape the traffic by the single-bucket model shaper, and determine a first end-to-end latency upper bound $DB_1$ of the traffic after being shaped based on a configuration parameter of a current shaper.

The single-bucket model shaper 203 satisfies a shaping function $\sigma(t) = b + rt$, where a parameter b represents a maximum burst size allowed by traffic output by the shaper, namely, a depth of a token bucket, and a parameter r represents an average rate of the traffic output by the shaper, namely, a token supplementary rate. At the beginning, the traffic 20 after being shaped by the single-bucket model shaper satisfies $(t) = b_0 + r_0 t$, namely, an initial configuration parameter set $S_1$ of the shaper is $\{_0, r_0\}$. The end-to-end latency upper bound of the traffic 20 is calculated using Manner 1, and the initial curve $\sigma(t)$ for the traffic 20 is set to be the single-point arrival curve $\alpha_1(t)$ at the first forwarding node 205 that receives the traffic. Therefore, the arrival curve (t) for the traffic is $\alpha_1(t) = \sigma(t) = b_0 + r_0 t$. The service curve $\beta_1(t)$ at the forwarding node 205 is $R_1(t-T_1)$, and the service curve $\beta_2(t)$ at the forwarding node 207 is $R_2(t-T_2)$, where $R_1$ and $R_2$ represent service rates, and $T_1$ and $T_2$ represent waiting latencies of the traffic at the node. Therefore, an expression of the end-to-end service curve for the traffic 20 may be obtained as $\beta(t) = \beta_{1,2}(t) = (\beta_1 \otimes \beta_2)(t) = \inf\_\{0 \leq s \leq t\}$ $(\beta_1(t-s) + \beta_2(s)) = \inf\_(R_1, R_2)(t - T_1 - T_2)$. Therefore, the first end-to-end latency upper bound $DB_1$ of the traffic 20 is $$\text{Max\_Hdis}(\alpha(t), \beta(t)) = \text{Max}_t(u : \alpha(t) + \beta(t+u)) = \frac{b0}{\min(R_1, R_2)} + T_1 + T_2.$$

S615'. Determine whether the first latency upper bound $DB_1$ satisfies the latency constraint $DB\_Cons'$, for example, $DB_1 \leq DB\_Cons'$, and if the first latency upper bound $DB_1$ does not satisfy the latency constraint $DB\_Cons'$, step S620' is performed, or if the first latency upper bound $DB_1$ satisfies the latency constraint $DB\_Cons'$, the method ends.

If the latency constraint of the traffic 20 is $DB\_Cons'$, and the first end-to-end latency upper bound $DB_1$ is determined to be greater than $DB\_Cons'$, the step S620' continues to be performed.

S620'. Determine and adjust at least one configuration parameter of the single-bucket model shaper based on the end-to-end bound latency constraint $DB\_Cons'$ such that a second end-to-end latency upper bound $DB_2$ of the traffic after being shaped by the shaper satisfies $DB_2 \leq DB\_Cons'$.

To satisfy a service latency requirement, the second end-to-end latency upper bound $DB_2$ needs to be re-determined such that $$DB_2 = \frac{b}{\min(R_1, R_2)} + T_1 + T_2 \leq DB\_Cons',$$

as long as a configuration parameter of the ingress shaper 203 satisfy a constraint $b \leq (DB\_Cons' - T_1 - T_2) \times \min(R_1, R_2)$ in this case. Any value of a parameter b is determined to satisfy the constraint. A value b1 of b satisfying the constraint is configured as an adjusted parameter value to the ingress shaper 203 such that the end-to-end latency of the traffic 20 after being shaped at the ingress according to $(t) = b_1 + r_0 t$ satisfies the constraint $DB\_Cons'$.

In a possible design, a value of a parameter r1 may be further adjusted based on a forwarding capability of each forwarding node such that the value satisfies a constraint $R_0 \leq r1 \leq \min(R_1, R_2)$. In other words, an average output rate of the traffic after being shaped at the ingress is greater than an average input rate of the traffic before being shaped, and does not exceed a minimum value of service rates of the forwarding nodes such that the traffic after being shaped complies with an actual forwarding capability of a forwarding path for corresponding traffic. In a specific implementation, when an initial value r0 of a parameter r is less than $\min(R_1, R_2)$, a value of the parameter r may be increased on a premise that a constraint $R_0 \leq r \leq \min(R_1, R_2)$ is satisfied, to fully use the service forwarding capability of each forwarding node as much as possible, and improve service quality of a network service. When the initial value r0 of the parameter r is greater than $\min(R_1, R_2)$, the value of the parameter r is decreased such that traffic output at the ingress does not exceed the service capability of each forwarding node, thereby reducing congestion and a packet loss rate as much as possible.

When all the parameters of the single-bucket shaper are adjusted at the same time, a configuration parameter set S1' of the adjusted single-bucket shaper is $\{b_1, r_1\}$. A parameter $b_1$ is adjusted based on the latency constraint DB_Cons'. A parameter $r_1$ may be adjusted based on a specific network requirement on a premise that the service forwarding capability of the forwarding node does not exceed.

Case 2. The shaper adapts to the time synchronization-based network scheduling policy.

Figure 6A:
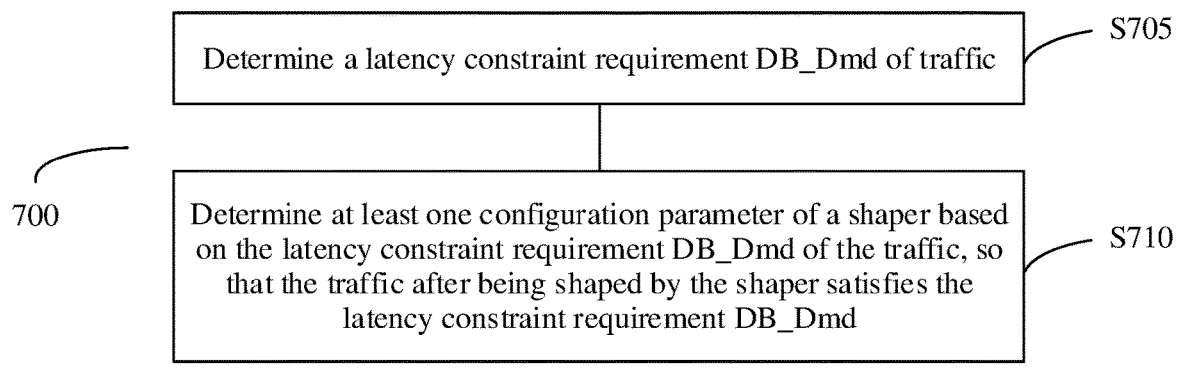
FIG. 6A is a schematic flowchart of a network shaper configuration method according to an embodiment of this application.

For traffic forwarding using the time synchronization-based network scheduling policy, an embodiment of this application provides a network shaper configuration method 700 that ensures a bound latency. A transmitted end-to-end bound latency of traffic in a network is determined based on a network scheduling policy complied with each forwarding node through which the traffic flows. A parameter of a shaper is configured based on a value of the end-to-end bound latency of the traffic such that transmission of the traffic satisfies a network latency constraint. As shown in FIG. 6A, the method 700 includes the following content.

S705. Determine a latency constraint requirement DB_Dmd of traffic.

Different from a network using a time asynchronization-based scheduling policy, a network using a time synchronization-based scheduling policy can ensure a single-point forwarding latency bound of the traffic at each forwarding node. Therefore, although end-to-end latency constraints DB_Cons of different traffic are also related to service types carried by the different traffic in the network, to ensure that the traffic is reliably transmitted without exceeding an actual forwarding capability of each forwarding node, after the traffic is shaped and output by the ingress shaper, the corresponding latency constraint requirement DB_Dmd should be actually satisfied. The latency constraint requirement DB_Dmd is used to ensure that after the traffic is shaped and output, the traffic flows through each forwarding node in the network, without exceeding the actual forwarding capability of each forwarding node such that no network congestion or a packet loss is caused. Therefore, the latency constraint requirement DB_Dmd is usually determined based on the single-point bound latency of each forwarding node through which the traffic flows in the network using the time synchronization-based scheduling policy. It is assumed that the traffic flows through n forwarding nodes in total on a transmission path, where a single-point bound latency of an $r^{th}$ ($1 \le r \le n$) forwarding node is $db_r$. In a general case, all forwarding nodes comply with a same network scheduling policy. In other words, single-point bound latencies $db_r$ of all the forwarding nodes are the same. In this case, the latency constraint requirement DB_Dmd of the traffic may be the single-point bound latency $db_r$ of the forwarding node. In another possible case, one or more of the forwarding nodes and the ingress shaper may comply with different time synchronization-based network scheduling policies. Alternatively, a plurality of forwarding nodes may comply with different time synchronization-based network scheduling policies. Because the single-point forwarding latency bound of the traffic at each forwarding node may be implemented, a single-point bound latency $db_r$ at each forwarding node using a network scheduling policy can be obtained. $db_r$ values of forwarding nodes that use different network scheduling policies may be different. Even if a plurality of forwarding nodes use a same network scheduling policy, scheduling control parameters configured for the plurality of forwarding nodes may also be different. As a result, $db_r$ values of the plurality of forwarding nodes may also be different. For the network using the time synchronization-based scheduling policy, the latency constraint requirement DB_Dmd that the traffic needs to satisfy may be determined based on a maximum value of the single-point bound latencies of all the forwarding nodes through which the traffic flows. Specifically, that the traffic flows through the n forwarding nodes is still used as an example. $db_{max}=\max\_\{db1, \ldots, +db_n, n \ge 1\}$, where $db_{max}$ is a maximum value of single-point bound latencies of all the n forwarding nodes through which the traffic flows. In this case, the latency constraint requirement DB_Dmd of the traffic is $db_{max}$, to ensure that congestion does not occur even though the traffic is at a forwarding node with a maximum single-point latency, and the traffic is reliably transmitted on the entire forwarding path.

The end-to-end transmission of the traffic 20 in the network structure shown in FIG. 2 is still used as an example. After being shaped by the ingress shaper 203, the traffic 20 from the sending node 201 is sent to the receiving node 209 after successively flowing through the forwarding nodes 205 and 207. For example, when the forwarding nodes 205 and 207 use a same scheduling policy and have a same single-point latency, the end-to-end latency constraint requirement DB_Dmd of the traffic 20 is $db_1=db_2$. When single-point latencies of the forwarding nodes 205 and 207 are different, for example, when a single-point latency of the forwarding node 205 is 3 seconds (s), and a single-point latency of the forwarding node 207 is 1 s, the latency constraint requirement satisfied by the traffic 20 should be not less than $db_{max}=\max\_\{1\ s, 3\ s\}=3$ s, to ensure that the congestion does not occur when the traffic is at the forwarding node 205 with a larger forwarding latency.

S710. Determine at least one configuration parameter of the shaper based on the latency constraint requirement DB_Dmd of the traffic such that the traffic after being shaped by the shaper satisfies the latency constraint requirement DB_Dmd.

For the network using the time asynchronization-based scheduling policy, a latency constraint on a piece of traffic is determined based on a latency requirement for the traffic from a network or a user, for example, may be determined based on a latency required by a service carried by the traffic. In addition, each forwarding node on a transmission path of the traffic does not have a preset single-point latency constraint. Therefore, in the network that complies with the time asynchronization scheduling policy, that the traffic after being shaped by a shaper satisfies the latency constraint is embodied as ensuring that the end-to-end latency upper bound DB of the traffic after being shaped by the ingress shaper is not greater than the latency constraint DB_Cons of the traffic, namely, DB≤DB_Cons, to ensure that end-to-end transmission of the traffic satisfies a latency requirement for the service carried by the traffic in the network.

However, different from that in the network using the time asynchronization-based scheduling policy, in the network using the time synchronization-based scheduling policy, a latency constraint of a piece of traffic is determined by a single-point bound latency of each forwarding node through which the traffic flows. The single-point bound latency of each forwarding node is preset in a network configuration phase. Therefore, in the network that complies with the time synchronization scheduling policy, that the traffic after being shaped by the shaper satisfies the latency constraint is embodied as ensuring that the latency DB of the traffic after being shaped by the ingress shaper is not less than the latency constraint requirement DB_Dmd, namely, DB≥DB_Dmd, to ensure that the congestion does not occur even through the traffic is at a forwarding node with a maximum forwarding latency.

As a specific example, an ingress shaper adapted to the time synchronization-based network scheduling policy may be, for example, a ladder model type, and is applied to a technology including, such as a time-aware shaper (TAS) defined in the IEEE 802.1 Qbv, a cyclic queuing and forwarding (CQF) algorithm defined in the IEEE 802.1 Qch, or the like, that can provide shaping and scheduling for time-aware data traffic in the network. In an embodiment, another shaping algorithm adapted to the time synchronization-based network scheduling policy may also be selected as required.

In some cases, both the shaper that the traffic flows into and a per-hop forwarding node comply with a same network scheduling policy, and network scheduling parameters used for the forwarding node are configured to be the same. In this case, one or more latency-related parameters of the shaper are directly configured based on a latency-related network scheduling parameter in the forwarding node, to ensure that the traffic satisfies the entire network latency requirement. For example, the latency-related shaping parameter may be directly configured as a corresponding scheduling parameter of each forwarding node, or may be configured as an appropriate value greater than a corresponding scheduling parameter of each forwarding node. The latency-related network scheduling parameter may be, for example, a sending period. In some other cases, any quantity of other configuration parameters may also be adjusted as required.

In some other cases, the plurality of forwarding nodes may comply with different network scheduling policies, or different forwarding nodes have different scheduling parameter configuration. As a result, single-point bound latencies of per-hop forwarding nodes may be different as described above. The one or more latency-related parameters of the shaper are configured based on the maximum value $db_{max}$ of the single-point bound latencies of the forwarding nodes. For example, when the latency-related shaping parameter is directly and uniquely determined based on the single-point bound latency of the forwarding node, the latency-related shaping parameter may be directly configured as an appropriate value greater than or equal to $db_{max}$, to ensure that traffic congestion does not occur on all the forwarding nodes.

To better match an actual forwarding capability of a path through which the traffic flows, another corresponding parameter of the shaper may be adaptively adjusted based on another network scheduling parameter of the forwarding node. For example, when the other network scheduling parameter includes a quantity of packets that can be forwarded, a minimum value of the quantity of packets that can be forwarded by each forwarding node in the sending period may be determined, and is used as a configuration value of the parameter of the quantity of packets that can be forwarded by the shaper. A configuration rule of the other network scheduling parameter may be determined based on a network structure, a scheduling policy complied with the network, and the like.

In a possible design, one or more parameters unrelated to the latency constraint may be further preconfigured, for example, a comparatively fixed configuration parameter.

The parameter of the shaper, configured using the foregoing various possible manners is denoted as a complete configuration parameter set $S_1$.

Figure 7:
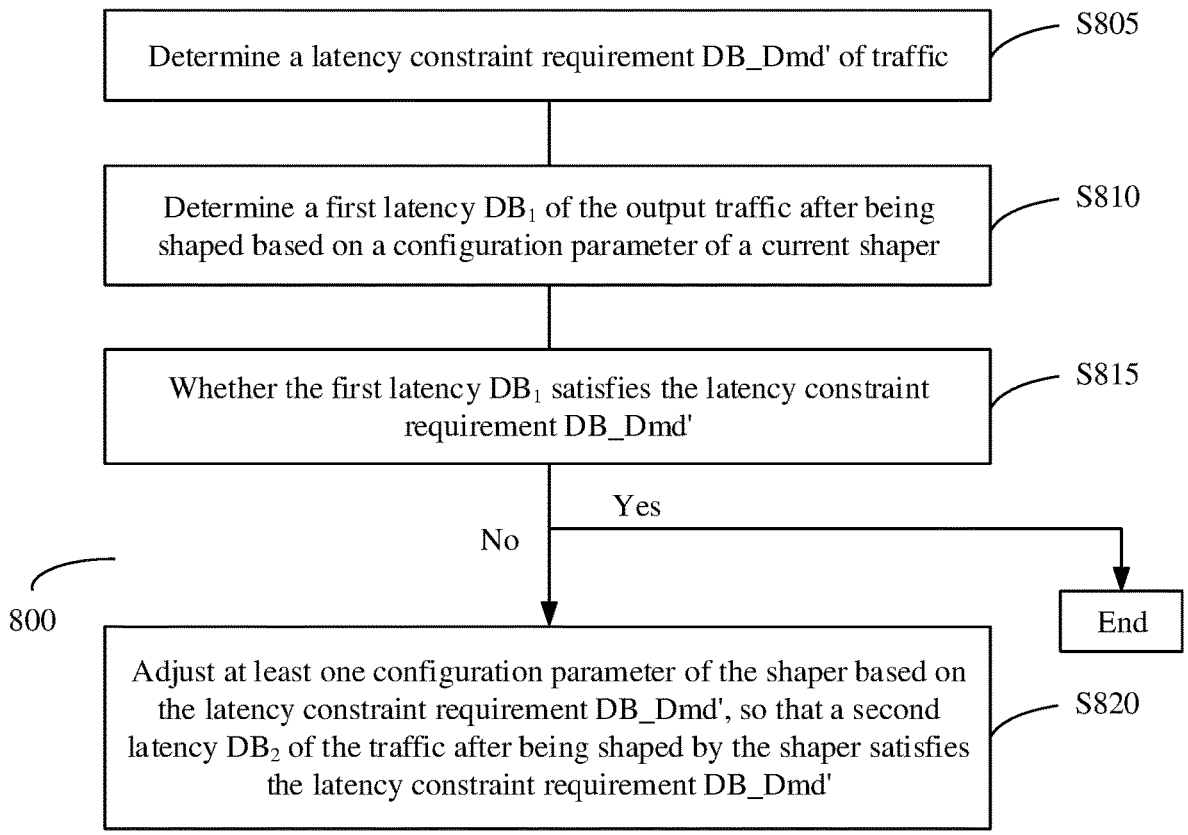
FIG. 7 is a schematic flowchart of a network shaper configuration method according to an embodiment of this application.

In some cases, for example, when the forwarding nodes through which the different traffic flows use different scheduling policies, or scheduling parameters configured for some or all the forwarding nodes are changed, the latency constraint requirement that the traffic needs to satisfy may change. As a result, for example, the end-to-end latency upper bound of the traffic after being shaped based on the configuration parameter determined in the method 700 does not satisfy the new service latency constraint. In another embodiment of this application, when finding that the traffic after being shaped based on the current configuration parameter cannot satisfy the new latency constraint requirement, the network control node may further adjust the one or more of the configuration parameters of the ingress shaper such that the traffic after being shaped based on an adjusted configuration parameter can satisfy a corresponding service latency constraint requirement. A method 800 for adjusting a configuration parameter of a shaper includes the following content, as shown in FIG. 7.

S805. Determine a latency constraint requirement DB_Dmd' of traffic.

It is assumed that the new latency constraint requirement is determined as DB_Dmd'. As a result, the latency of the traffic after being shaped does not satisfy the new latency constraint requirement. Alternatively, in some cases, although the latency constraint requirement DB_Dmd' corresponding to the traffic does not change, expected latency constraint satisfaction changes. For example, for a piece of traffic, a latency of the traffic after being shaped based on parameter configuration of a current shaper does not reach a minimum latency allowed for a path through which the traffic flows. In this case, a shaping parameter of the shaper may still be adjusted such that a latency of the traffic after being shaped is further optimized to improve network transmission efficiency and bandwidth utilization.

The foregoing case is merely used as an example. In an embodiment, the latency constraint of the traffic may be re-determined according to another requirement or a preset rule.

S810. Determine a first latency $DB_1$ of the output traffic after being shaped based on the configuration parameter of the current shaper.

A calculation manner for the first latency $DB_1$ of the output traffic after being shaped based on the configuration parameter of the current shaper depends on a specific shaping model used by the shaper. For example, for a shaper of a CQF or TAS model that supports a time synchronization scheduling policy, the latency of the traffic after being shaped is a sending period parameter set in the foregoing two models. In other possible cases, the latency of the traffic after being shaped may also be directly obtained or deduced based on another parameter. This is related to a specific shaping model selected by the shaper.

S815. Determine whether the first latency $DB_1$ satisfies the latency constraint requirement DB_Dmd', and if the first latency $DB_1$ does not satisfy the latency constraint requirement DB_Dmd', step S820 is performed, or if the first latency $DB_1$ satisfies the latency constraint requirement DB_Dmd', the method ends.

Determining whether the first latency $DB_1$ satisfies the re-determined latency constraint requirement DB_Dmd' is mainly determining whether the traffic after being shaped based on the current shaping parameter configuration can be normally forward on each forwarding node when there is no congestion, determining, on a basis that the traffic can be normally forwarded and based on the new latency constraint requirement DB_Dmd', whether optimization needs to be performed on the latency of the traffic after being shaped, or the like.

Traffic forwarding in FIG. 2 is still used as an example. In an initial status, if the single-point latency of the forwarding node 205 is 3 milliseconds (ms), and the single-point latency of the forwarding node 207 is 1 s, the traffic 20 should initially satisfy a latency constraint requirement DB_Dmd=3 ms. The shaper configures the shaping parameter accordingly such that the first latency $DB_1$ of the traffic 20 after being shaped is 4 ms, for example, satisfies $DB_1$>DB_Dmd'. In a possible case, if the single-point latency of the forwarding node 207 is adjusted to 5 s because a scheduling parameter of the forwarding node 207 changes, the latency constraint DB_Dmd' of the traffic 20 should be re-determined as max_{3 ms, 5 ms}=5 ms. In this case, the first latency of the traffic 20 after being shaped based on the initially configured shaping parameter is $DB_1$ (=4 s)<DB_Dmd' (=5 s). In other words, the new latency constraint DB_Dmd' is not satisfied. In this way, when the traffic 20 is transmitted to the forwarding node 207, a single-point forwarding capability of the forwarding node 207 is exceeded. Consequently, congestion occurs when the traffic 20 is on the forwarding node 207. Therefore, the step S820 needs to be performed to adjust the shaper parameter configuration such that a second latency of the traffic 20 after being shaped satisfies the new latency constraint DB_Dmd'. In another possible case, single-point latencies of the forwarding nodes 205 and 207 do not change, and the latency constraint DB_Dmd of the traffic 20 is still 3 ms. In this case, because the first latency of the traffic 20 after being shaped based on the initial configuration parameter is DB (=4 ms)>DB_Dmd (=3 ms). It may be considered to perform the optimization on the shaper parameter configuration such that a second latency $DB_2$ of the traffic 20 after being shaped based on an optimized configuration parameter is equal to the latency constraint DB_Dmd'. In this case, the latency constraint DB_Dmd' is DB_Dmd, namely, 3 ms. This improves the network transmission efficiency and the bandwidth utilization. The foregoing case is merely used as an example, and another case in which the latency constraint is not satisfied may also be applicable.

S820. Adjust at least one configuration parameter of the shaper based on the latency constraint requirement DB_Dmd' such that the second latency $DB_2$ of the traffic after being shaped by the shaper satisfies the latency constraint requirement, namely, $DB_2 \geq DB\_Dmd'$.

In the step S820, a manner of adjusting one or more configuration parameters of the shaper based on the redetermined latency constraint requirement DB_Dmd' of the traffic is similar to the parameter configuration manner in the step S710. Details are not described herein again. It should be noted that, when an operation of adjusting a parameter set of the shaper is performed, any group of parameter set $S_1'$ that can satisfy a constraint of $DB_2 \geq DB\_Dmd'$ usually needs to be determined. The operation may be implemented by adjusting one or more shaping parameters in the parameter set $S_1$ of the shaper. A new adjusted parameter set is denoted as $S_1'$. However, in some cases, for example, when further optimization is expected for latency constraint satisfaction on a premise that a basic latency constraint requirement DB_Dmd is satisfied, a group of parameter set $S_1'$ may be directly determined such that $DB_2$=DB_Dmd'. Alternatively, a group of parameter set $S_1'$ is determined such that $DB_2$ can be at least closer to DB_Dmd' than that before the shaping parameter is adjusted. For example, for the second case shown in the step S815 in which the parameter needs to be optimized, it may also be considered to adjust the configuration parameter of the shaper such that the second latency $DB_2$ of the traffic 20 after being shaped is at least closer to the latency constraint requirement DB_Dmd' (3 ms) than that before the adjustment, for example, adjust from 4 s to 3.5 ms. If there are a plurality of shaper parameters, all or some of the parameters may be adjusted based on a parameter meaning, a service scenario, and the like. Alternatively, one or more of the parameters may be first adjusted based on an adjustment difficulty, and if the latency constraint still cannot be satisfied, a plurality of other parameters are adjusted. A specific adjustment principle of the shaper parameter and a quantity of the adjusted shaper parameters can be set as required.

Figure 6B:
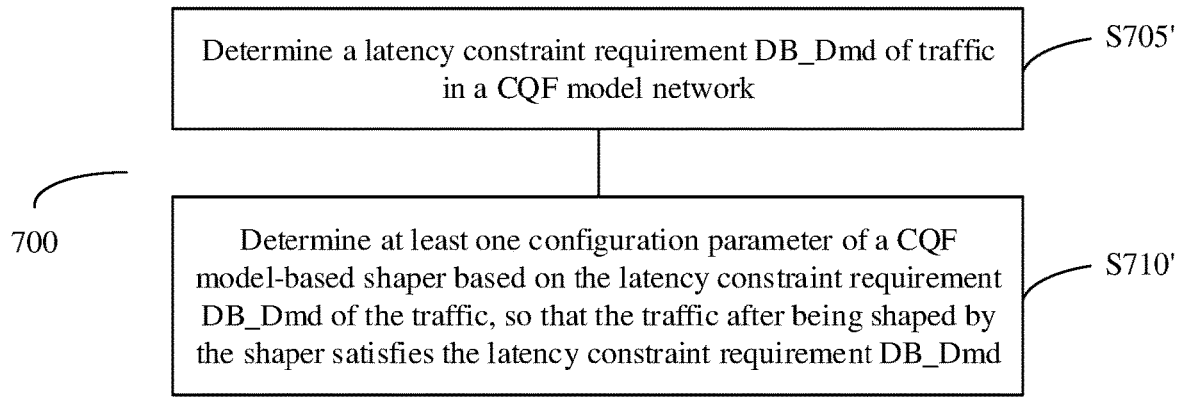
FIG. 6B is a schematic flowchart of a network shaper configuration method according to an embodiment of this application.

To describe a possible implementation of this application more clearly, the following describes in detail the configuration method 700 shown in FIG. 6B based on a case in which a shaping parameter of a shaper of a CQF model needs to be configured. The shaper of a CQF model adapts to a time synchronization-based network scheduling policy.

Forwarding of the traffic 20 in the network structure shown in FIG. 2 is still used as an example for description. It is assumed that the ingress shaper 203 through which the traffic 20 flows and all the forwarding nodes 205 and 207 through which the traffic 20 flows use a CQF network scheduling policy. A CQF shaping configuration parameter includes a sending period T (ms), a maximum quantity M of packets that can be sent in the sending period and a maximum packet length L (byte). It is assumed that a parameter set $S_1$ that needs to be configured for the shaper 203 is $\{T_s, M_s, L_s\}$. The method 700' includes the following content, as shown in FIG. 6B.

S705'. Determine a latency constraint requirement DB_Dmd of traffic in a CQF model-based network.

The forwarding nodes 205 and 207 both use the CQF network scheduling policy. A CQF scheduling parameter set $S_{205}$ of the forwarding node 205 is $\{T_{205}=100$ ms, $M_{205}=10$, $L_{205}=1500$ bytes$\}$. A CQF scheduling parameter set $S_{207}$ of the forwarding node 207 is $\{T_{207}=150$ ms, $M_{205}=15$, $L_{205}=2000$ bytes$\}$.

The end-to-end latency constraint of the traffic 20 is determined based on a maximum value of single-point bound latencies of both the forwarding nodes 205 and 207 through which the traffic 20 flows. In the CQF model-based network, a single-point bound latency of a forwarding node is determined by a configuration parameter the sending period T in a CQF. Therefore, the end-to-end latency constraint requirement DB_Dmd of the traffic 20 is max_$\{T_{205}, T_{207}\}$=max_{100 ms, 150 ms}=150 ms.

S710'. Determine at least one or more configuration parameters of the shaper of the CQF model based on the latency constraint requirement DB_Dmd of the traffic such that the traffic after being shaped by the shaper satisfies the latency constraint.

Based on the latency constraint requirement DB_Dmd=150 ms, one of shaping parameters of the ingress shaper 203 through which the traffic 20 flows may be configured. In other words, the sending period $T_s$ is 150 ms. In some cases, the sending period $T_s$ may also be configured to any appropriate value greater than 150 ms, to implement zero-congestion transmission of the traffic as much as possible. In some embodiments, the corresponding shaping parameter of the shaper 203 may be further configured based on another scheduling parameter configured for the forwarding nodes 205 and 207, namely, the maximum quantity M of the packets that can be sent in the period T and/or the maximum packet length L. For example, a maximum quantity $M_s$ of packets that can be sent by the shaper 203 in the period $T_s$=150 ms may be set to $M_s$=min_$\{M_{205}, M_{207}\}$=min_{10, 15}=10, and a maximum packet length $L_s$ may be set to $L_s=\min\_\{L_{205}, L_{207}\}=\min\_\{1500$ bytes, 2000 bytes$\}=1500$ bytes. Therefore, it is ensured that an output rate of the traffic 20 after being shaped by the shaper 203 does not exceed a minimum forwarding capability of each forwarding node through which the traffic 20 flows, to avoid the network congestion, fully utilize a forwarding capability of the network, and improve the network transmission efficiency and service quality at the same time.

In some cases, it may also be considered that each shaping parameter of the shaper is not determined strictly based on the foregoing preset maximum or minimum value calculation principle, but is appropriately adjusted within an appropriate and controllable range with reference to a corresponding value determined based on the calculation principle and with reference to an actual scenario. For example, it may be considered to configure $T_s$, $M_s$, and $L_s$ as 140 ms, 15, and 1500 bytes respectively, to balance the overall traffic transmission efficiency and less single-point congestion. This may be necessary in some network applications. For example, a service carried by the traffic needs a low latency. Therefore, when a packet loss at a low probability is allowed to occur and the traffic flows through many forwarding nodes, it may be considered to perform flexible and appropriate selective association configuration on each corresponding shaping parameter of the shaper. The foregoing case is merely used as an example. A specific configuration manner can be determined based on an actual requirement and an application scenario.

In some possible embodiments, although in the methods 700, and 800 shown in Case 2 and in the specific example of the method 700 using a CQF algorithm, the latency constraint satisfied by the output traffic after being shaped by the shaper is determined based on the latency of each forwarding node through which the traffic flows in the network using the time asynchronization scheduling policy, in a specific application, it usually needs to be considered to use the end-to-end network latency constraint DB_Cons of the network for different traffic as a precondition constraint condition, to ensure that the end-to-end latency upper bound of the traffic after being shaped by the shaper satisfies the end-to-end network latency constraint for a corresponding service. Similar to the step S505 in the method 500, in the network using the time synchronization network scheduling policy, the end-to-end network latency constraint DB_Cons of the traffic is also related to the service type carried by the traffic, the transmission rate requirement for the traffic in a specific time period, another possible network data transmission requirement, or the like. For example, for traffic used to carry different services, network latency constraints DB_Cons may be different. Details are not described herein. That the end-to-end network latency constraint DB_Cons of the traffic is used as the precondition constraint condition is when the end-to-end latency upper bound DB determined based on each forwarding node through which the traffic flows does not exceed the end-to-end latency constraint DB_Cons of the network for the traffic, the shaper parameter is configured or adjusted using the method 700 or 800. Otherwise, it indicates that the current forwarding capability of the node through which the traffic flows cannot satisfy the actual network requirement, the entire network may need to be upgraded or reconstructed, and the like. Therefore, a configuration operation or an adjustment operation may not be performed on the shaper parameter temporarily, to save a network bandwidth and reduce unnecessary resource waste. In a possible embodiment, the end-to-end latency upper bound determined based on the forwarding node through which the traffic flows is a sum of single-point bound latencies $db_r$ of the forwarding nodes. In a possible embodiment, prompt information may be output to a user, to prompt the user to perform adaptation reconstruction, performance improvement, or the like on the forwarding capability of the network forwarding node.

In some possible embodiments, for various shaper parameter configuration and adjustment methods in Case 1 and Case 2, one or more trigger conditions may be set for performing a corresponding method. When the one or more trigger conditions are satisfied at the same time, the foregoing various methods are performed on traffic sent by a monitored sending unit. The trigger condition may include a specific time interval, a network monitoring rule, and the like. For example, when a traffic type sent by the sending node 201 including the sending unit 102 is fixed or comparatively fixed in a comparatively long period of time, for example, is a type of the traffic 20, the foregoing method may be performed on the traffic sent at intervals of 60*s*. When the traffic type sent by the sending node 201 is flexibly variable, it may be considered to set the network monitoring rule as detecting whether the traffic type is changed. When it is found that the traffic sent by the sending node 201 changes, the foregoing methods are triggered. Alternatively, the network monitoring rule is set as reaching a specific network congestion duration or level. When congestion duration or level in the network is found to reach the preset value, a network control node including the network control unit 101 triggers the foregoing methods to determine a data flow causing network congestion, to adjust a shaping parameter of a corresponding sending node. Alternatively, to prevent the network congestion, the network monitoring rule is set as detecting burst increase of the traffic at the network node. When the burst increase of the traffic is found on the network node, the foregoing methods are triggered. Alternatively, in the network using the time synchronization-based scheduling policy, the foregoing methods may be triggered when it is detected that the configuration parameters of the one or more forwarding nodes in the network change. Alternatively, a plurality of the trigger conditions may be set, for example, when it is detected that the traffic type changes and a specific time interval is satisfied at the same time, the foregoing methods are triggered, and the like. In an embodiment, the trigger condition and the trigger rule may be set as required, and the foregoing trigger condition and rule are merely examples.

To ensure that the packet loss does not occur as much as possible when a network latency occurs, it may be considered to configure comparatively large buffer space for the forwarding node in the network, to accommodate as much as possible, overstocked data of the traffic that can satisfy the network latency requirement for the forwarding node. In some cases, for example, when burst data traffic occurs on the forwarding node, a large amount of data traffic is aggregated within a period of time, or buffer space of the forwarding node is limited, a storage resource may need to be appropriately saved on a premise that no congestion or packet loss occurs as much as possible. Therefore, robust and appropriate buffer space needs to be allocated to the traffic. For the network using the time synchronization-based scheduling policy described above, because the corresponding scheduling policy is used to ensure a per-hop latency bound of the forwarding node, specific buffer space can be planned and preset for each forwarding node in a comparatively controllable manner. This ensures that the traffic is forwarded without congestion or with less congestion under the per-hop bound latency constraint. However, for the network using the time asynchronization-based scheduling policy, although the traffic is shaped at the ingress to satisfy the specific latency constraint as much as possible, the per-hop latency of the traffic at each forwarding node cannot be pre-determined. As a result, the congestion caused by the latency of the traffic at each forwarding node cannot be estimated. Therefore, it is difficult to reserve appropriate buffer space in advance to store overstocked data of the traffic.

Figure 8:
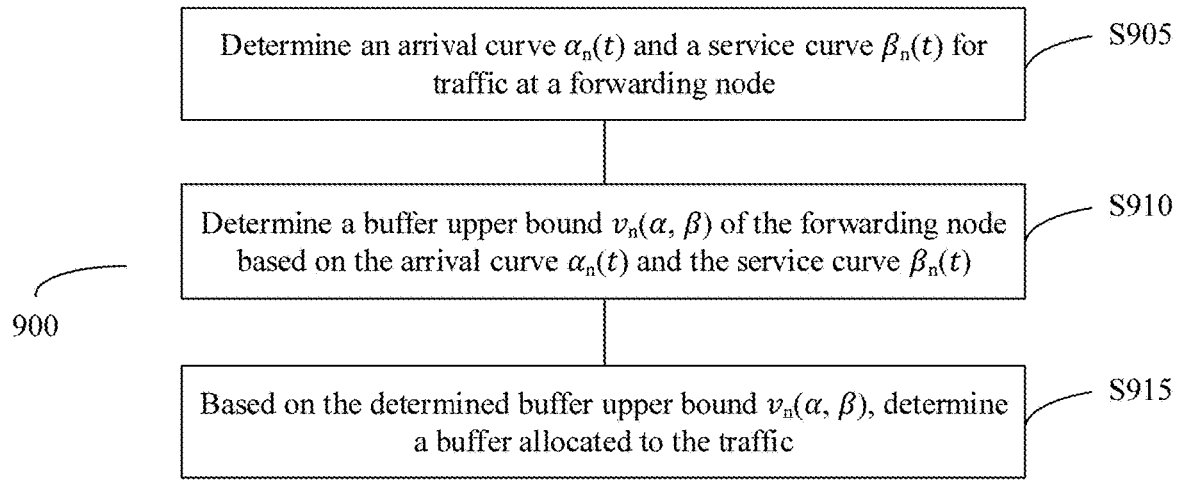
FIG. 8 is a schematic flowchart of a network node configuration method according to an embodiment of this application.

An embodiment of this application further provides a device traffic buffer configuration method 900 such that a data overstock upper bound of a network node is calculated based on network calculus as a buffer upper bound of the network node, and a buffer of the network node is configured based on the buffer upper bound, to save a configuration resource on a premise that network congestion is avoided as much as possible. The network node may be, for example, a per-hop forwarding node through which traffic flows. For example, the method may be used in combination with the method 500, 600 (600'), 700 (700'), or 800. The method 900 includes the following content, as shown in FIG. 8.

S910. Determine an arrival curve $\alpha_n(t)$ and a service curve $\beta_n(t)$ for the traffic at a forwarding node.

The arrival curve $\alpha_n(t)$ for the traffic at the current forwarding node may be obtained through calculation based on an arrival curve $\alpha_{n-1}(t)$ and a service curve $\beta_{n-1}(t)$ at a previous-hop forwarding node of the current forwarding node. Specifically, $\alpha_n(t)=\sup\_\{u\geq 0\}\{\alpha_{n-1}(t+u)-\beta_{n-1}(u)\}$. In an embodiment, at any given moment, all u≥0 is traversed to solve a supremum value of $\alpha_{n-1}(t+u)-\beta_{n-1}(u)$. The supremum value is used as a return result of the arrival curve $\alpha_n(t)$ at the current forwarding node at the moment t. u is an intermediate variable, and may be any value greater than or equal to 0. sup_ represents calculating a supremum (supremum) of a set. For example, sup_{E} represents calculating a supremum of a set E, namely, a minimum element of all other elements greater than or equal to E. The minimum element is not necessarily in the set E. The service curve for the traffic at the current forwarding node is determined based on a forwarding capability of the node. For example, the service curve may be affected by factors such as a scheduling mechanism followed by the node, a maximum packet length, and a port rate, and may be expressed as $\beta_n(t)$.

The arrival curve $\alpha_n(t)$ and the service curve $\beta_n(t)$ of the traffic flowing through the current forwarding node may be calculated in real time when a buffer of the node needs to be estimated, or calculation results of a single-point arrival curve and a single-point service curve may be pre-stored when the upper latency bound of the traffic is calculated. When the buffer of the node needs to be estimated, corresponding storage content is directly obtained. For details, refer to corresponding descriptions in the step S610.

S915. Determine a buffer upper bound $v_n(\alpha, \beta)$ of the forwarding node based on the arrival curve $\alpha_n(t)$ and the service curve $\beta_n(t)$.

The data overstock upper bound of the forwarding node, namely, the buffer upper bound $v_n(\alpha, \beta)$ may be calculated based on $v_n(\alpha, \beta)=\text{Max\_Vdis}(\alpha_n(t), \beta_n(t))=\sup\_\{t\geq 0\}\{\alpha_n(t)-\beta_n(t)\}$. In other words, all t≥0 are traversed, to solve a supremum value of $\alpha_n(t)-\beta_n(t)$. The supremum value is used as a calculation result of the buffer upper bound $v_n(\alpha, \beta)$ of the current forwarding node. The calculation result is a maximum vertical distance between the arrival curve $\alpha_n(t)$ and the service curve $\beta_n(t)$ at the forwarding node.

S920. Based on the determined buffer upper bound $v_n(\alpha, \beta)$, determine a buffer allocated to the traffic.

Based on the determined buffer upper bound $v_n(\alpha, \beta)$, the buffer allocated to the traffic is determined. The allocated buffer is greater than or equal to the buffer upper bound $v_n(\alpha, \beta)$. In consideration of factors such as a hardware implementation or a storage policy, some buffer space may be lost during actual data storage. During buffer allocation, specific tolerance may be appropriately added based on the buffer upper bound $v_n(\alpha, \beta)$, to cope with a storage space loss at a possible implementation layer.

$v_n(\alpha, \beta)$ obtained through calculation using the foregoing method is a buffer upper bound of a single flow, and a buffer size allocated based on the buffer upper bound is also for the single flow. In an embodiment, one forwarding node usually needs to carry multi-flow forwarding. For example, summation calculation may be performed based on a buffer allocated to each single flow, to determine an overall buffer space size required by the forwarding node to implement non-congestion forwarding of all traffic flows, and allocate corresponding buffer space and/or a corresponding buffer location based on an actual required buffer for each single flow.

In a network using time asynchronization-based scheduling policy, in some cases, due to factors such as network transmission or a processing capability of the forwarding node, a comparatively obvious latency may occur when the traffic flows through each forwarding node, and the latency may be usually transmitted hop by hop. As latencies accumulate, a traffic burst occurs on a forwarding node. As a result, a congestion packet loss occurs. To avoid occurrence of the foregoing case, in a possible embodiment, a corresponding per-hop shaper may be configured on each forwarding node, to perform per-hop shaping and regulation on the traffic. The per-hop network shaper may be configured at a traffic output position of the current forwarding node, to shape output traffic forwarded by the current forwarding node before the traffic is sent to a next forwarding node. Different from an ingress shaper, the per-hop shaper usually does not shape to-be-forwarded traffic in different forms. Instead, before forwarding traffic, the per-hop shaper normalizes the traffic based on a shape when the traffic enters the ingress. Therefore, the per-hop shaper and the ingress shaper usually support a same shaping model, for example, support a single-bucket model. However, for transmission of a same piece of traffic, the per-hop shaper and the ingress shaper support the same shaping model, and may have a same configuration parameter or different parameters. A specific parameter value can be configured based on an actual scenario. The per-hop shaper may be, for example, the independent shaper 106 shown in FIG. 1. Alternatively, the per-hop shaper may be used as a unit in a corresponding forwarding node to implement a per-hop shaping function, for example, integrated into the forwarding node 205 and/or the forwarding node 207 shown in FIG. 2.

In a possible embodiment, for each forwarding node that forwards the traffic, shaping parameter configuration of a per-hop shaper used for each forwarding node may be the same as parameter configuration of the ingress shaper. After the traffic is shaped by the per-hop shaper, an arrival curve $\alpha_n'(t)$ output at the forwarding node is the same as the initial curve (t) after shaping is performed at an ingress. In an embodiment, $\alpha_n'(t)=(t)$, where n=1, . . . , N, and N is a quantity of forwarding nodes of which the traffic flows through the traffic forwarding path. In another possible embodiment, the shaping parameter configuration of the per-hop shaper used for each forwarding node may also be configured as required. In this case, arrival curves $\alpha_n'(t)$ output at all forwarding nodes may be different from each other, and may also be different from the initial curve $\sigma(t)$ after the shaping is performed at the ingress. It should be noted that, after the traffic is shaped by the per-hop shaper on the forwarding node, the output arrival curve $\alpha_n'(t)$ is usually different from an arrival curve $\alpha_n(t)$ directly output at a same forwarding node without performing per-hop shaping but performing the shaping only at the ingress, namely, $\alpha_n'(t) \alpha_n(t)$. In some special cases, $\alpha_n'(t)$ may be the same as $\alpha_n(t)$ in the calculation result, namely, $\alpha_n'(t)=\alpha_n(t)$.

When the per-hop shaper is disposed, because the service curve at each forwarding node is related only to the forwarding capability of each forwarding node, the service curve at each forwarding node is not affected by the per-hop shaping. In other words, the service curve $\beta_n'(t)$ at each forwarding node on which the per-hop shaper is configured is the same as the service curve $\beta_n(t)$ when the shaping is performed only at the ingress, namely, $\beta_n'(t)=\beta_n(t)$.

Based on the determined $\alpha_n'(t)$ and $\beta_n'(t)$ at each forwarding node, a per-hop latency $db_n$ of the current forwarding node may be obtained as $\text{Max\_Hdis}(\alpha_n'(t), \beta_n'(t))$ through calculation. In addition, an end-to-end bound latency DB of the traffic may be determined as $db_1 + \ldots, db_N$ accordingly after the per-hop shaping and regulation are performed, where N is the quantity of forwarding nodes through which the traffic flows. Therefore, the per-hop shaping and the regulation of the per-hop shaper ensures a single-point latency bound in a time asynchronization-based network to some extent. In some cases, for example, when the configuration parameter of each per-hop shaper is different from the configuration parameter of the ingress shaper, the parameter of the ingress shaper may be adjusted based on the determined end-to-end bound latency DB. For a specific adjustment manner, refer to the method 600. It should be noted that the foregoing describes a case in which the per-hop shaper is configured on each forwarding node. In an embodiment, per-hop shapers may also be configured on some selected forwarding nodes as required. For example, based on historical monitoring data, the per-hop shapers are configured on key forwarding nodes that are prone to the packet loss or latency variation, to avoid the network congestion and save a network resource as much as possible.

The foregoing describes disposition of the per-hop shaper and the method for determining the latency in a single-flow scenario. In an embodiment, multi-flow aggregation may occur at each forwarding node. The multi-flow aggregation indicates a case in which a plurality of pieces of traffic of a same form are aggregated at a same forwarding node such that the plurality of pieces of traffic are forwarded after being aggregated by the forwarding node. For example, a piece of traffic A, a piece of traffic B, and a piece of traffic C of the single-bucket model reach the same forwarding node. An arrival curve for the traffic A is $\alpha_1(t)=b_1+r_1 t$. An arrival curve for the traffic B is $\alpha_2(t)=b_2+r_2 t$. An arrival curve for the traffic C is $\alpha_3(t)=b_3+r_3 t$. Values of parameters $b_1$, $b_2$, and $b_3$ can be the same, partially the same, or all the same. Values of parameters $r_1$, $r_2$, and $r_3$ can be the same, partially the same, or all the same. After receiving the traffic A, the traffic B, and the traffic C, the forwarding node aggregates the traffic A, the traffic B, and the traffic C into one aggregation flow satisfying a single-bucket form. For the multi-flow aggregation case, after the aggregation flow is shaped by the per-hop shaper corresponding to the forwarding node, the output arrival curve during shaping is determined based on an aggregation arrival curve for the aggregation flow formed by the plurality of pieces of traffic. For example, when a shaping model of the per-hop shaper is a linear model, the aggregation arrival curve is $\alpha_{nm}'(t)=\Sigma_1^M \alpha_n^i(t)$, where $n=1, \ldots, N$, N is the quantity of forwarding nodes of which the traffic flows through the forwarding path, M is a quantity of single flows aggregated on the forwarding node, $\alpha_n^i(t)$ is an arrival curve for a single flow on an $n^{th}$ forwarding node before an $i^{th}$ piece of traffic is aggregated. For a calculation manner of $\alpha_n^i(t)$, refer to the foregoing case for the single flow. For example, when the traffic A, the traffic B, and the traffic C are aggregated into the aggregation flow at a second forwarding node, the aggregation arrival curve obtained after the three pieces of single flows are aggregated is $\alpha_{nm}'(t)\Sigma_1^3 \alpha_2^i(t)=(b_1+b_2+b_3)+(r_1+r_2+r_3)t$.

For the per-hop shaping on the multi-flow aggregation, because the service curve at each forwarding node is related only to the forwarding capability of each forwarding node, the service curve at each forwarding node is not affected by the per-hop shaping. In other words, the service curve $\beta_{nm}'(t)$ of each forwarding node on which the per-hop shaper is configured is the same as the service curve $\beta_n(t)$ when the shaping is performed only at the ingress, namely, $\beta_{nm}'(t)=\beta_n(t)$. Based on the determined $\alpha_{nm}'(t)$ and $\beta_{nm}'(t)$ at each forwarding node, a multi-flow per-hop latency $db_{nm}$ of the current forwarding node may be obtained as $\text{Max\_Hdis}((_{nm}'(t)-(_{nm}'(t))$ through calculation. In addition, the end-to-end bound latency DB of the traffic may be determined as $\Sigma_1^N db_n$ accordingly after the per-hop shaping and regulation are performed, where N is the quantity of forwarding nodes through which the traffic flows.

Figure 9:
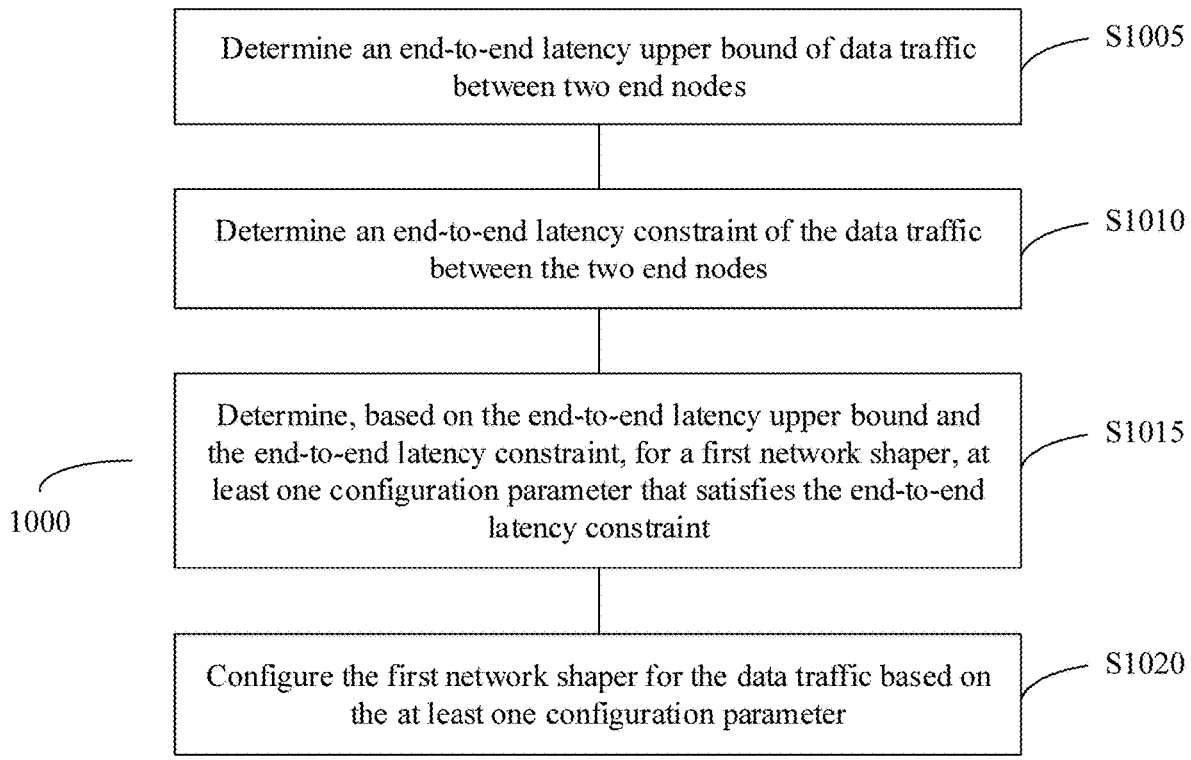
FIG. 9 is a schematic flowchart of a network configuration method according to an embodiment of this application.

An embodiment of this application further provides a network configuration method 1000, as shown in FIG. 9. It should be noted that a network shaper described in the method 1000 is usually configured at a traffic ingress, for example, a position of a network edge node, and is configured to shape traffic at the ingress, for example, the ingress shaper 104 shown in FIG. 1. The method 1000 may be performed, for example, by a network management device in a network. The method 1000 includes the following content.

S1005. Determine an end-to-end latency upper bound DB of data traffic between two end nodes.

FIG. 2 is still used as an example, and the two end nodes are respectively the sending node 201 and the receiving node 209. In a network using a time asynchronization-based scheduling policy, the end-to-end latency upper bound between the sending node 201 and the receiving node 209 may be obtained through calculation based on a network calculus algorithm. For example, any one of Manner 1 to Manner 4 for calculating the end-to-end latency upper bound based on the network calculus algorithm is used for determining, or refer to the step S510 in the method 500, or the step S610 (S610') in the method 600 (600').

In a network using a time synchronization-based scheduling policy, the end-to-end latency upper bound is determined based on single-point bound latencies of forwarding nodes between the two end nodes. The end-to-end latency upper bound is determined based on a sum of the single-point bound latencies of the forwarding nodes between the two end nodes. For example, summation may be performed on single-point bound latencies of the forwarding nodes 205 and 207 between the sending node 201 and the receiving node 209, to obtain the end-to-end latency upper bound through calculation.

S1010. Determine an end-to-end latency constraint DB_Cons of the data traffic between the two end nodes.

The end-to-end latency constraint DB_Cons of the traffic is usually related to a service type carried by the traffic. Different traffic may carry different service types. The different service types may also have different latency constraints in the network. In addition to being related to the service type carried by the traffic, the end-to-end latency constraint DB_Cons may further be related to a transmission rate requirement for the traffic in a specific time period, or another possible network data transmission requirement. For a specific example, refer to the step S505 in the method 500.

In some cases, the end-to-end latency constraint of the traffic may further need to be re-determined as DB_Cons'. For example, a service type carried by traffic flowing into a shaper may change, or although the service type carried by the traffic does not change, a latency requirement for a same service type changes. In this case, the new end-to-end latency constraint is determined as DB_Cons'. For example, refer to the step S605 (S605') in the method 600 (600').

S1015. Determine, based on the end-to-end latency upper bound DB and the end-to-end latency constraint DB_Cons, for a first network shaper, at least one configuration parameter that satisfies the end-to-end latency constraint.

In the network using the time asynchronization-based scheduling policy, when configuring a parameter of the first network shaper, the network management device may determine the end-to-end latency constraint DB_Cons of the traffic based on the service type carried by the traffic. The end-to-end latency upper bound may be represented as a latency upper bound function, and may be represented as the latency upper bound function generated using an arrival curve function and a service curve function that are based on the network calculus algorithm. A shaper of a single bucket model is used as an example. The end-to-end latency upper bound is expressed as a latency upper bound function including parameters b and r. A parameter b represents a maximum burst size allowed by traffic output by the shaper. A parameter r represents an average output rate of the traffic output by the shaper. Based on the latency upper bound function including the parameter b and a value of the end-to-end latency constraint DB_Cons, a value b1 of the configuration parameter b when the end-to-end latency constraint DB_Cons is satisfied can be calculated. Accordingly, b1 is determined as one of configuration parameter values of the shaper of the single bucket model. In a possible embodiment, the network management device may further determine the configuration parameter r of the shaper. The configuration parameter r may be, for example, determined to be greater than or equal to an average input rate of the traffic before being shaped, and less than or equal to a value $r_1$ in a minimum value interval of service rates of all forwarding nodes between the two end nodes. For example, refer to the step S515 in the method 500, or the step S615 (S615') and the step 620 (620') in the method 600 (600').

In the network using the time synchronization-based scheduling policy, a single-point forwarding latency bound of the traffic at each forwarding node can be ensured. Therefore, the end-to-end latency upper bound DB may be determined based on each single-point bound latency of each forwarding node between the two end nodes. For example, the summation may be performed on single-point bound latencies of all the forwarding nodes, to determine the end-to-end latency upper bound DB. The end-to-end network latency constraint DB_Cons of the traffic is also related to the service type carried by the traffic, the transmission rate requirement for the traffic in the specific time period, another possible network data transmission requirement, or the like. Likewise, for example, the end-to-end latency constraint DB_Cons of the traffic may be determined based on the service type carried by the traffic. Only when the determined end-to-end latency upper bound DB satisfies the end-to-end network latency constraint DB_Cons, configuration or adjustment on a parameter of the shaper is triggered. Otherwise, it indicates that the forwarding capability of the current node of which the traffic flows through on a path cannot satisfy the actual network requirement. There is no need to perform a configuration or adjustment operation on the parameter of the shaper.

When that the end-to-end latency upper bound DB satisfies the end-to-end network latency constraint DB_Cons is determined, one or more configuration parameters of the shaper may be determined based on the single-point bound latency of each forwarding node. A shaper of a CQF model is used as an example. The network management device may determine, based on the single-point bound latencies of all the forwarding nodes between the two end nodes, a maximum value of all the single-point bound latencies, and determine, based on the maximum value, for the shaper, a sending period that satisfies the end-to-end latency constraint. The sending period is one configuration parameter of the shaper. The network management device may further determine another configuration parameter of the shaper. The other configuration parameter may include, for example, a maximum quantity of packets that can be sent in the configured sending period and/or a maximum packet length. For details, refer to the method 700 (700') or the method 800.

S1020. Configure the data traffic for the first network shaper based on the at least one configuration parameter.

The network management device may configure the data traffic for the first network shaper based on all the determined configuration parameters.

In some possible embodiments, as described in the step S910, the end-to-end latency constraint of the traffic may change. For example, when a traffic constraint requirement for a same service type changes, or a service type in another piece of traffic that flows into the shaper changes, a new end-to-end latency constraint DB_Cons' needs to be determined in this case. Consequently, after shaping is performed based on the current configuration parameter of the first network shaper, the end-to-end latency upper bound DB does not satisfy the end-to-end latency constraint DB_Cons'. The configuration parameters of the shaper need to be adaptively adjusted. The single-bucket model-based shaper model is used as an example, a value $b_2$ of the configuration parameter b may be re-determined at least based on the new end-to-end latency constraint DB_Cons'.

In a possible embodiment, the method 1000 further includes the following.

S1025. Determine configuration parameters of one or more second network shapers respectively corresponding to one or more forwarding nodes between the two end nodes, where the configuration parameters of the one or more second network shapers are the same as corresponding configuration parameters of the first network shaper such that per-hop regulation is performed on the data traffic that flows through the one or more forwarding nodes.

In the network using the time asynchronization-based scheduling policy, a corresponding per-hop shaper may be configured on each forwarding node in some cases, to perform per-hop shaping and regulation on the traffic. This avoids a traffic burst on a forwarding node and a congestion packet loss caused with accumulation of the latencies. The second network shaper is the per-hop shaper, and may be configured at a traffic output position of a current forwarding node, to shape output traffic forwarded by the current forwarding node before the traffic is sent to a next forwarding node. For transmission of a same piece of traffic, the second network shaper and the first network shaper usually support a same shaping model. Specific configuration parameters may be the same, or may be different. In a possible embodiment, the network management device is configured to configure a shaping parameter of the second network shaper used for each forwarding node to be the same as the parameter configuration of the first network shaper. In consideration that multi-flow aggregation may also occur on each forwarding node, the network management device may also determine a multi-flow per-hop latency of the current forwarding node based on an arrival curve function and a service curve function that are formed on a corresponding forwarding node after the multi-flow aggregation, and configure the configuration parameter of the second network shaper accordingly.

In a possible embodiment, the method 1000 further includes the following.

S1030. Determine a buffer upper bound of the current forwarding node based on an arrival curve function and a service curve function at a previous forwarding node through which the data traffic flows, and determine a buffer of the current forwarding node based on the buffer upper bound, where the buffer is configured to temporarily store the data traffic in the current forwarding node.

In the network using the time asynchronization-based scheduling policy, it may be considered to configure appropriate buffer space for each forwarding node in the network, without excessively wasting a storage resource, to avoid or alleviate the packet loss caused by the latency. Therefore, the network management device may calculate, based on the network calculus, the data overstock upper bound of the device as the upper bound. The buffer upper bound may be obtained through calculation based on a maximum vertical distance between the arrival curve $\alpha_n(t)$ and the service curve $\beta_n(t)$ of the forwarding node. The network management device may configure the buffer of the forwarding node based on the determined buffer upper bound.

Figure 10:
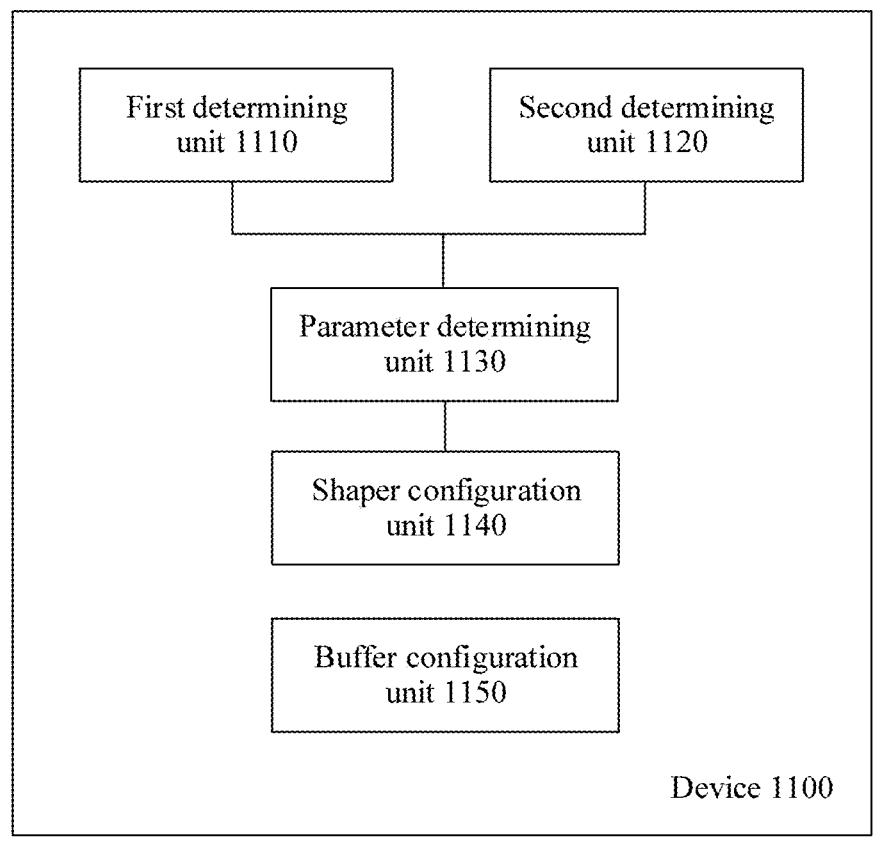
FIG. 10 is a schematic diagram of a structure of a network configuration device according to an embodiment of this application.

An embodiment of this application further provides a network configuration device 1100, as shown in FIG. 10. The device 1100 includes a first determining unit 1110, a second determining unit 1120, a parameter determining unit 1130, and a shaper configuration unit 1140. Each unit may be configured to correspondingly perform the method 500, 600 (600'), 700 (700'), 800, 900, or 1000.

The first determining unit 1110 is configured to determine an end-to-end latency upper bound of data traffic between two end nodes.

The second determining unit 1120 is configured to determine an end-to-end latency constraint of the data traffic between the two end nodes.

The parameter determining unit 1130 is configured to determine, based on the end-to-end latency upper bound and the end-to-end latency constraint, for a first network shaper, at least one configuration parameter that satisfies the end-to-end latency constraint.

The shaper configuration unit 1140 is configured to configure the data traffic for the first network shaper based on the at least one configuration parameter.

In a possible embodiment, the end-to-end latency upper bound is represented as a latency upper bound function. The first determining unit 1110 of the device 1100 is further configured to generate the latency upper bound function using an arrival curve function and a service curve function that are based on a network calculus algorithm. The end-to-end latency upper bound is represented as a latency upper bound function including a first variable. The first variable represents a maximum burst size allowed by traffic output by the first network shaper. The first variable belongs to the at least one configuration parameter. For example, a corresponding execution part in the method 500, 600 (600'), or 1000 is executed.

In a possible embodiment, the parameter determining unit 1130 is further configured to calculate a value of the first variable under a condition that the end-to-end latency upper bound satisfies the end-to-end latency constraint. The parameter determining unit 1130 is further configured to determine a first rate. The first rate is an average output rate of the data traffic on the first network shaper. The first rate is greater than or equal to an average input rate of the data traffic and is less than or equal to a minimum value of service rates of all forwarding nodes between the two end nodes. The first rate belongs to the at least one configuration parameter. For example, the corresponding execution part in the method 500, 600 (600'), or 1000 is executed.

In a possible embodiment, the shaper configuration unit 1140 is further configured to determine configuration parameters of one or more second network shapers respectively corresponding to one or more forwarding nodes between the two end nodes. The configuration parameters of the one or more second network shapers are the same as corresponding configuration parameters of the first network shaper such that per-hop regulation is performed on the data traffic that flows through the one or more forwarding nodes. For example, the corresponding execution part in the method 1000 is executed.

In a possible embodiment, the device 1100 further includes a buffer configuration unit 1150. The buffer configuration unit 1150 is configured to determine a buffer upper bound of the current forwarding node based on an arrival curve function and a service curve function at a previous forwarding node through which the data traffic flows, and determine a buffer of the current forwarding node based on the buffer upper bound. The buffer is configured to temporarily store the data traffic in the current forwarding node. For example, the corresponding execution part in the method 900, or 1000 is executed.

In a possible embodiment, that the second determining unit 1120 determines the end-to-end latency constraint of the data traffic between the two end nodes includes determining the end-to-end latency upper bound based on single-point bound latencies of all forwarding nodes between the two end nodes. For example, a corresponding execution part in the method 700 (700'), 800, or 1000 is executed.

In a possible embodiment, that the parameter determining unit 1130 determines, based on the end-to-end latency upper bound and the end-to-end latency constraint, for the first network shaper, the at least one configuration parameter that satisfies the end-to-end latency constraint includes determining that the end-to-end latency upper bound satisfies the end-to-end latency constraint, when the end-to-end latency upper bound satisfies the end-to-end latency constraint, determining a maximum value of all the single-point bound latencies based on the single-point bound latencies of all the forwarding nodes between the two end nodes, and determining, based on the maximum value of all the single-point bound latencies, for the first network shaper, a configuration parameter that satisfies the end-to-end latency constraint. For example, the configuration parameter is a sending period. Another configuration parameter in the at least one configuration parameter further includes a maximum quantity of packets that can be sent in the configured sending period and/or a maximum packet length. For example, the corresponding execution part in the method 700 (700'), 800, or 1000 is executed.

Figure 11:
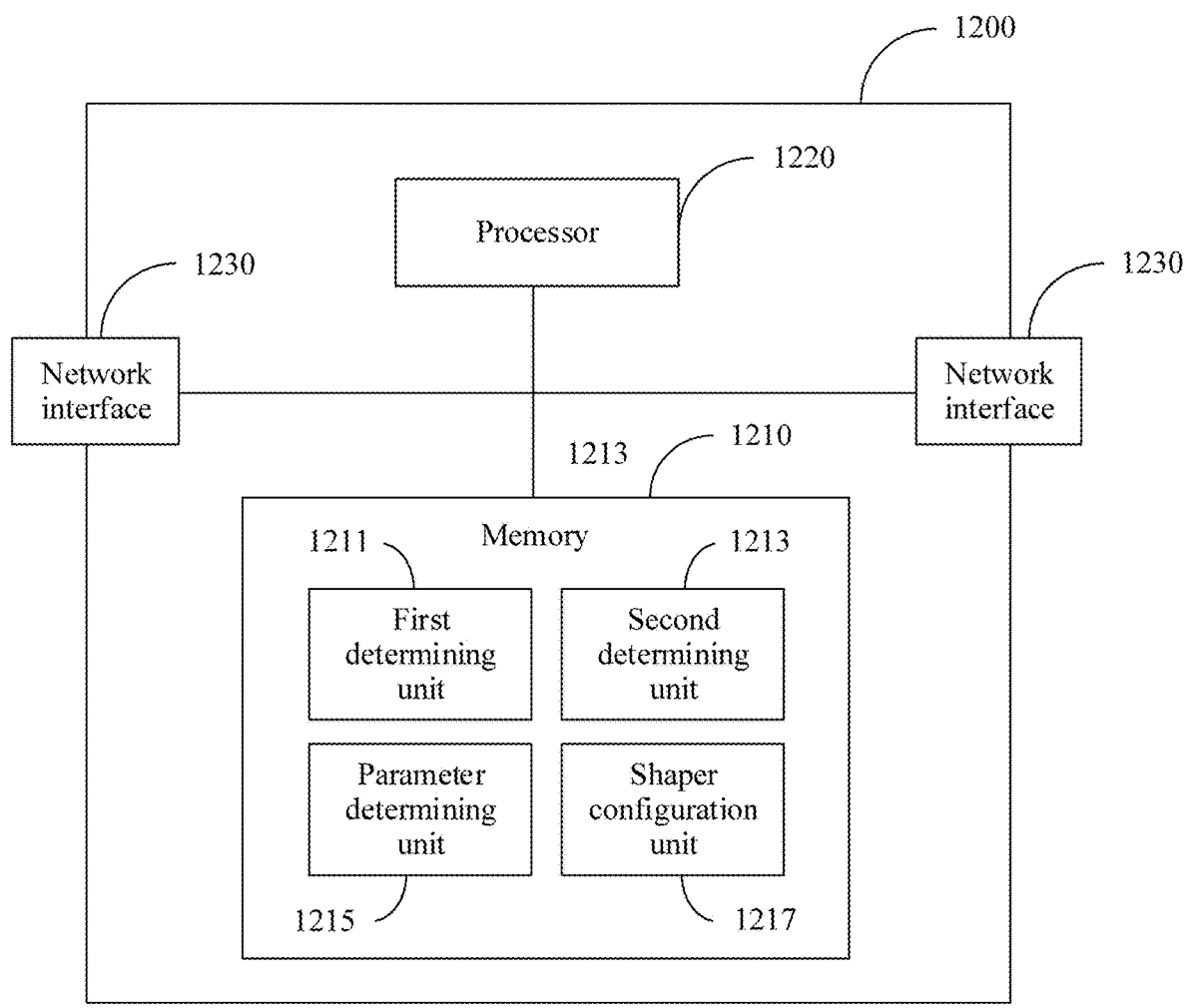
FIG. 11 is a schematic diagram of a structure of a network configuration device according to an embodiment of this application.

An embodiment of this application further provides a network configuration device 1200, as shown in FIG. 11. The device 1200 includes a memory 1210, a processor 1220, and one or more network interfaces 1230. The one or more network interfaces 1230 are configured to receive information from a network and/or send information that needs to be sent by a network management system to the network. The network interface 1230 may send, to the memory 1210 and the processor 1220, information received from the network, or send, to the network, information processed or generated by the processor 1220. The information may be, for example, a packet carrying data traffic that needs to be forwarded. The memory 1210 is configured to store a computer-readable instruction. The processor 1220 is configured to execute the readable instruction stored in the memory 1210 such that the device 1200 performs the method 500, 600 (600'), 700 (700'), 800, 900, or 1000. For specific execution content and implemented functions, refer to the descriptions of the foregoing methods. Details are not described herein again. In an example, when the device 1200 performs the method 900, the computer-readable instruction in the memory 1210 may include a first determining unit 1211, a second determining unit 1213, a parameter determining unit 1215, and a shaper configuration unit 1217.

An embodiment of this application further provides a computer-readable storage medium or a computer program product configured to separately store a corresponding computer program. The computer program is used to perform the methods 500, 600 (600'), 700 (700'), 800, 900, and 1000.

It should be understood that in this embodiment of this application, a processor may be a central processing unit (CPU), one or more network processors (NP), or a combination of a CPU and an NP. The processor may be alternatively one or more programmable logic devices (PLD) or a combination thereof. The PLD may be a complex programmable logic device (CPLD), a field-programmable gate array (FPGA), generic array logic (GAL), or any combination of the CPLD, the FPGA, or the GAL.

A memory may be one memory, or may include a plurality of memories. The memory includes a volatile memory, such as a random-access memory (RAM). The memory may further include a non-volatile memory, such as a read-only memory (ROM), a flash memory, a hard disk drive (HDD), or a solid-state drive (SSD). The memory may further include a combination of the foregoing types of memories.

A network interface may be an Ethernet network interface, or may be another type of network interface.

It may be understood that a structural composition of the network configuration device 1100 is merely a possible example. In an embodiment, the device 1100 may include any quantity of interfaces, processors, memories, and the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware, or a combination of computer software and electronic hardware. Whether the functions are performed by hardware or software depends on particular applications and design constraint conditions of the technical solutions. A person skilled in the art may implement the described functions for each specific application using different methods.

All or some of the foregoing embodiments may be implemented using software, hardware, firmware, or any combination thereof. When software or firmware is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example a coaxial cable, an optical fiber, or a twisted pair) or wireless (for example infrared, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, an SSD), or the like. All parts in this specification are described in a progressive manner, and for same or similar parts in the embodiments, refer to these embodiments. Especially, the device embodiment is basically similar to a method embodiment, and therefore is described briefly, for related parts, refer to descriptions in the method embodiment.

In summary, it should be noted that what is described above is merely example embodiments of the technical solutions of this application, but is not intended to limit the protection scope of this application.

What is claimed is:

1. A network configuration method, comprising:
determining an end-to-end latency upper bound of data traffic between two end nodes;
determining an end-to-end latency constraint of the data traffic between the two end nodes;
determining at least one configuration parameter that satisfies the end-to-end latency constraint for a first network shaper based on the end-to-end latency upper bound and the end-to-end latency constraint; and
configuring the first network shaper for the data traffic based on the at least one configuration parameter.

2. The method of claim 1, wherein the end-to-end latency upper bound is based on a latency upper bound function, and wherein determining the end-to-end latency upper bound of the data traffic comprises generating the latency upper bound function using an arrival curve function and a service curve function that are based on a network calculus algorithm.

3. The method of claim 2, wherein the end-to-end latency upper bound is based on a latency upper bound function comprising a first variable representing a maximum burst size of traffic output from the first network shaper and belonging to the at least one configuration parameter.

4. The method of claim 3, wherein determining the at least one configuration parameter comprises calculating a value of the first variable in response to the end-to-end latency upper bound satisfying the end-to-end latency constraint.

5. The method of claim 1, further comprising determining a first rate, wherein the first rate is an average output rate of the data traffic on the first network shaper, wherein the first rate is greater than or equal to an average input rate of the data traffic and is less than or equal to a minimum value of service rates of a plurality of forwarding nodes between the two end nodes, and wherein the first rate belongs to the at least one configuration parameter.

6. The method of claim 1, further comprising determining a plurality of configuration parameters of one or more second network shapers corresponding to a plurality of forwarding nodes between the two end nodes, wherein the configuration parameters are the same as a plurality of corresponding configuration parameters of the first network shaper such that a per-hop shaper performs per-hop regulation on the data traffic that flows through the forwarding nodes.

7. The method of claim 2, further comprising:
determining a buffer upper bound of a current forwarding node based on the arrival curve function and the service curve function at a previous forwarding node through which the data traffic flows; and
determining a buffer of the current forwarding node based on the buffer upper bound, wherein the buffer stores the data traffic in the current forwarding node.

8. The method of claim 1, wherein determining the end-to-end latency constraint of the data traffic comprises determining the end-to-end latency upper bound based on a plurality of single-point bound latencies of a plurality of forwarding nodes between the two end nodes.

9. The method of claim 8, wherein determining the at least one configuration parameter comprises:
determining that the end-to-end latency upper bound satisfies the end-to-end latency constraint;
determining a maximum value of the single-point bound latencies between the two end nodes based on the single-point bound latencies of the forwarding nodes in response to the end-to-end latency upper bound satisfying the end-to-end latency constraint; and
determining a first configuration parameter that satisfies the end-to-end latency constraint for the first network shaper based on the maximum value of the single-point bound latencies.

10. The method of claim 9, wherein the first configuration parameter is a sending period, wherein a second configuration parameter in the at least one configuration parameter of the first network shaper comprises a maximum quantity of packets that can be sent in at least one of the configured sending period or a maximum packet length.

11. A network configuration device, comprising:
a processor; and,
a memory coupled to the processor and configured to store instructions that, when executed by the processor, cause the network configuration device to be configured to:
determine an end-to-end latency upper bound of data traffic between two end nodes;
determine an end-to-end latency constraint of the data traffic between the two end nodes;
determine at least one configuration parameter that satisfies the end-to-end latency constraint for a first network shaper based on the end-to-end latency upper bound and the end-to-end latency constraint; and
configure the first network shaper for the data traffic based on the at least one configuration parameter.

12. The network configuration device of claim 11, wherein the end-to-end latency upper bound is based on a latency upper bound function, wherein the instructions that cause the network configuration device to be configured to determine the end-to-end latency upper bound of the data traffic further cause the network configuration device to be configured to generate the latency upper bound function using an arrival curve function and a service curve function that are based on a network calculus algorithm.

13. The device of claim 12, wherein the end-to-end latency upper bound is based on a latency upper bound function comprising a first variable representing a maximum burst size of traffic output from the first network shaper, and wherein the first variable belongs to the at least one configuration parameter.

14. The device of claim 13, wherein the instructions that cause the network configuration device to determine the at least one configuration parameter that satisfies the end-to-end latency constraint further causes the network configuration device to be configured to calculate a value of the first variable under a condition that the end-to-end latency upper bound satisfies the end-to-end latency constraint.

15. The device of claim 11, wherein the instructions further cause the network configuration device to be configured to determine a first rate, wherein the first rate is an average output rate of the data traffic on the first network shaper, wherein the first rate is greater than or equal to an average input rate of the data traffic and is less than or equal to a minimum value of service rates of a plurality of forwarding nodes between the two end nodes, and wherein the first rate belongs to the at least one configuration parameter.

16. The device of claim 11, wherein the instructions further cause the network configuration device to be configured to determine configuration parameters of one or more second network shapers corresponding to a plurality of forwarding nodes between the two end nodes, wherein the configuration parameters are the same as a plurality of corresponding configuration parameters of the first network shaper such that per-hop regulation is performed on the data traffic that flows through the forwarding nodes.

17. The device of claim 12, wherein the instructions further cause the network configuration device to be configured to:
determine a buffer upper bound of a current forwarding node based on the arrival curve function and the service curve function at a previous forwarding node through which the data traffic flows; and
determine a buffer of the current forwarding node based on the buffer upper bound, wherein the buffer stores the data traffic in the current forwarding node.

18. The device of claim 11, wherein the instructions that cause the network configuration device to determine the end-to-end latency constraint of the data traffic further causes the network configuration device to be configured to determine the end-to-end latency upper bound based on a plurality of single-point bound latencies of all forwarding nodes between the two end nodes.

19. The device of claim 18, wherein the instructions that cause the network configuration device to determine the at least one configuration parameter that satisfies the end-to-end latency constraint further causes the network configuration device to:
determine that the end-to-end latency upper bound satisfies the end-to-end latency constraint;
determine a maximum value of the single-point bound latencies between the two end nodes based on the single-point bound latencies in response to the end-to-end latency upper bound satisfying the end-to-end latency constraint; and determine a first configuration parameter that satisfies the end-to-end latency constraint for the network shaper based on the maximum value of the single-point bound latencies.

20. A non-transitory computer readable medium comprising instructions which, when executed by a processor of a network configuration device, cause the network configuration device to:

determine an end-to-end latency upper bound of data traffic between two end nodes;

determine an end-to-end latency constraint of the data traffic between the two end nodes;

determine at least one configuration parameter that satisfies the end-to-end latency constraint for a first network shaper based on the end-to-end latency upper bound and the end-to-end latency constraint; and configure the first network shaper for the data traffic based on the at least one configuration parameter.

* * * * *